(12) United States Patent
Pankratov et al.

(10) Patent No.: US 9,969,572 B2
(45) Date of Patent: May 15, 2018

(54) PALLET BUILDING SYSTEM

(71) Applicant: Symbotic LLC, Wilmington, MA (US)

(72) Inventors: Kirill K. Pankratov, Acton, MA (US);
David Ehrenberg, Medfield, MA (US);
Larry M. Sweet, Wenham, MA (US)

(73) Assignee: Symbotic, LLC, Wilmington, MA (US)

( * ) Notice: Subject to any disclaimer, the term of this patent is extended or adjusted under 35 U.S.C. 154(b) by 0 days. days.

(21) Appl. No.: 14/628,978

(22) Filed: Feb. 23, 2015

(65) Prior Publication Data

US 2015/0166272 A1 Jun. 18, 2015

Related U.S. Application Data

(63) Continuation of application No. 13/654,293, filed on Oct. 17, 2012, now Pat. No. 8,965,559.

(60) Provisional application No. 61/548,105, filed on Oct. 17, 2011.

(51) Int. Cl.
| | |
|---|---|
| *B65G 61/00* | (2006.01) |
| *G06Q 10/04* | (2012.01) |
| *G06Q 10/08* | (2012.01) |
| *B65G 57/09* | (2006.01) |
| *B65G 57/03* | (2006.01) |
| *G05B 15/02* | (2006.01) |

(52) U.S. Cl.
CPC ............ *B65G 61/00* (2013.01); *B65G 57/03* (2013.01); *B65G 57/09* (2013.01); *G05B 15/02* (2013.01); *G06Q 10/043* (2013.01); *G06Q 10/08* (2013.01); *B65G 2201/0214* (2013.01)

(58) Field of Classification Search
None
See application file for complete search history.

(56) References Cited

U.S. PATENT DOCUMENTS

| | | |
|---|---|---|
| 3,586,176 A | 6/1971 | Rackman et al. |
| 4,287,459 A | 9/1981 | Dahlstrom |
| 4,641,271 A | 2/1987 | Konishi et al. |
| 4,692,876 A | 9/1987 | Tenma et al. |
| 4,746,255 A | 5/1988 | Roccabianca et al. |

(Continued)

FOREIGN PATENT DOCUMENTS

| | | |
|---|---|---|
| CN | 201990058 | 9/2011 |
| JP | 2002120938 | 4/2002 |

(Continued)

*Primary Examiner* — Yolanda R Cumbess
(74) *Attorney, Agent, or Firm* — Perman & Green, LLP

(57) ABSTRACT

An automated palletizer includes an automated package pick device capable of moving packages from a package deposit section to a pallet to form a pallet load from packages, a controller that is operably connected to the automated pick device, the controller having a pallet load generator configured to determine a pallet load structure of mixed packages, the pallet load generator being programmed so that it determines the load structure from mixed package layers overlaid over each other at least one of the mixed package layers being formed of stacks of mixed packages, top and bottom surfaces of the stacks corresponding to the at least one mixed package layer respectively forming top and bottom surfaces of the at least one mixed package layer that are substantially flat. The controller generates commands for the pick device to build the pallet load from the load structure determined by the pallet load generator.

23 Claims, 18 Drawing Sheets

(56) References Cited

U.S. PATENT DOCUMENTS

| | | |
|---|---|---|
| 4,772,170 A | 9/1988 | Oldfield |
| 4,900,219 A | 2/1990 | Azzopardi et al. |
| 4,941,374 A | 7/1990 | Focke |
| RE33,416 E | 10/1990 | Konishi et al. |
| 5,050,090 A | 9/1991 | Golub et al. |
| 5,098,254 A | 3/1992 | Becicka et al. |
| 5,163,808 A | 11/1992 | Tsubone et al. |
| 5,175,692 A | 12/1992 | Mazouz et al. |
| 5,203,671 A | 4/1993 | Cawley et al. |
| 5,281,081 A | 1/1994 | Kato |
| 5,372,472 A | 12/1994 | Winski et al. |
| 5,383,760 A | 1/1995 | Cawley et al. |
| 5,501,571 A | 3/1996 | Van Durrett et al. |
| 5,636,966 A | 6/1997 | Lyon et al. |
| 5,716,189 A | 2/1998 | Winski et al. |
| 5,733,098 A | 3/1998 | Lyon et al. |
| 5,794,416 A * | 8/1998 | Rahman ............... B65G 67/20 53/157 |
| 5,844,807 A | 12/1998 | Anderson et al. |
| 5,934,864 A | 8/1999 | Lyon et al. |
| 5,961,275 A | 10/1999 | Winski et al. |
| 5,996,316 A | 12/1999 | Kirschner |
| 6,055,462 A | 4/2000 | Sato |
| 6,286,656 B1 * | 9/2001 | Huang ................. B65G 47/90 198/418.9 |
| 6,425,226 B1 | 7/2002 | Kirschner |
| 6,699,007 B2 | 3/2004 | Huang et al. |
| 6,871,116 B2 | 3/2005 | Brust et al. |
| 7,184,855 B2 | 2/2007 | Stingel, III et al. |
| 7,210,894 B2 | 5/2007 | Huang et al. |
| 7,266,422 B1 | 9/2007 | DeMotte et al. |
| 7,798,763 B2 | 9/2010 | Ouellette et al. |
| 2003/0176944 A1 | 9/2003 | Stingel, III et al. |
| 2004/0220694 A1 | 11/2004 | Stingel, III et al. |
| 2007/0071585 A1 | 3/2007 | Henkel |
| 2007/0280814 A1 | 12/2007 | Morency et al. |
| 2008/0046116 A1 | 2/2008 | Khan et al. |
| 2010/0228385 A1 * | 9/2010 | Beck ................. B65G 1/1378 700/217 |
| 2010/0249988 A1 | 9/2010 | Baldes et al. |

FOREIGN PATENT DOCUMENTS

| | | |
|---|---|---|
| JP | 2003252447 | 9/2003 |
| JP | 2007254078 | 10/2007 |
| TW | 201040099 | 11/2010 |

* cited by examiner

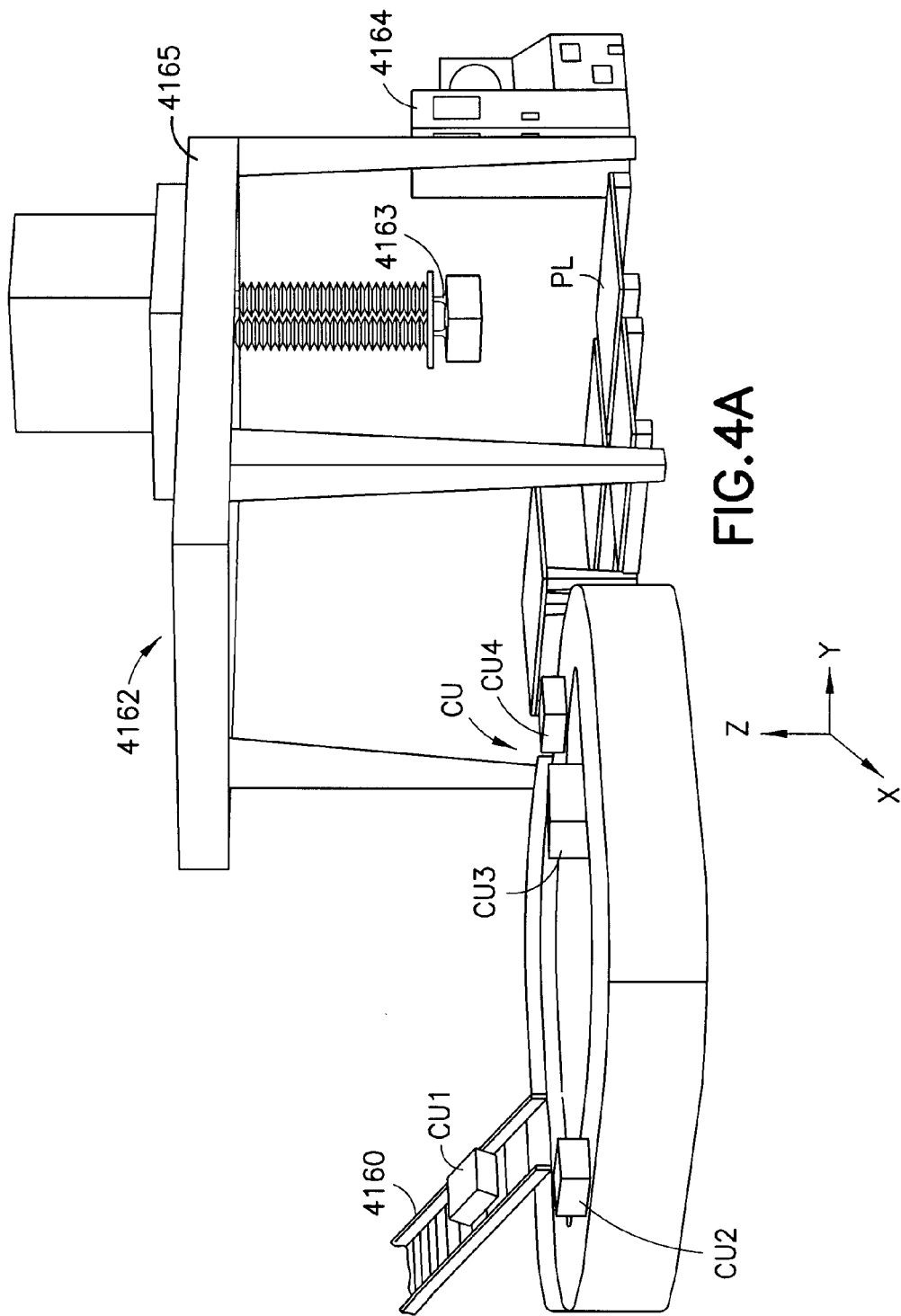

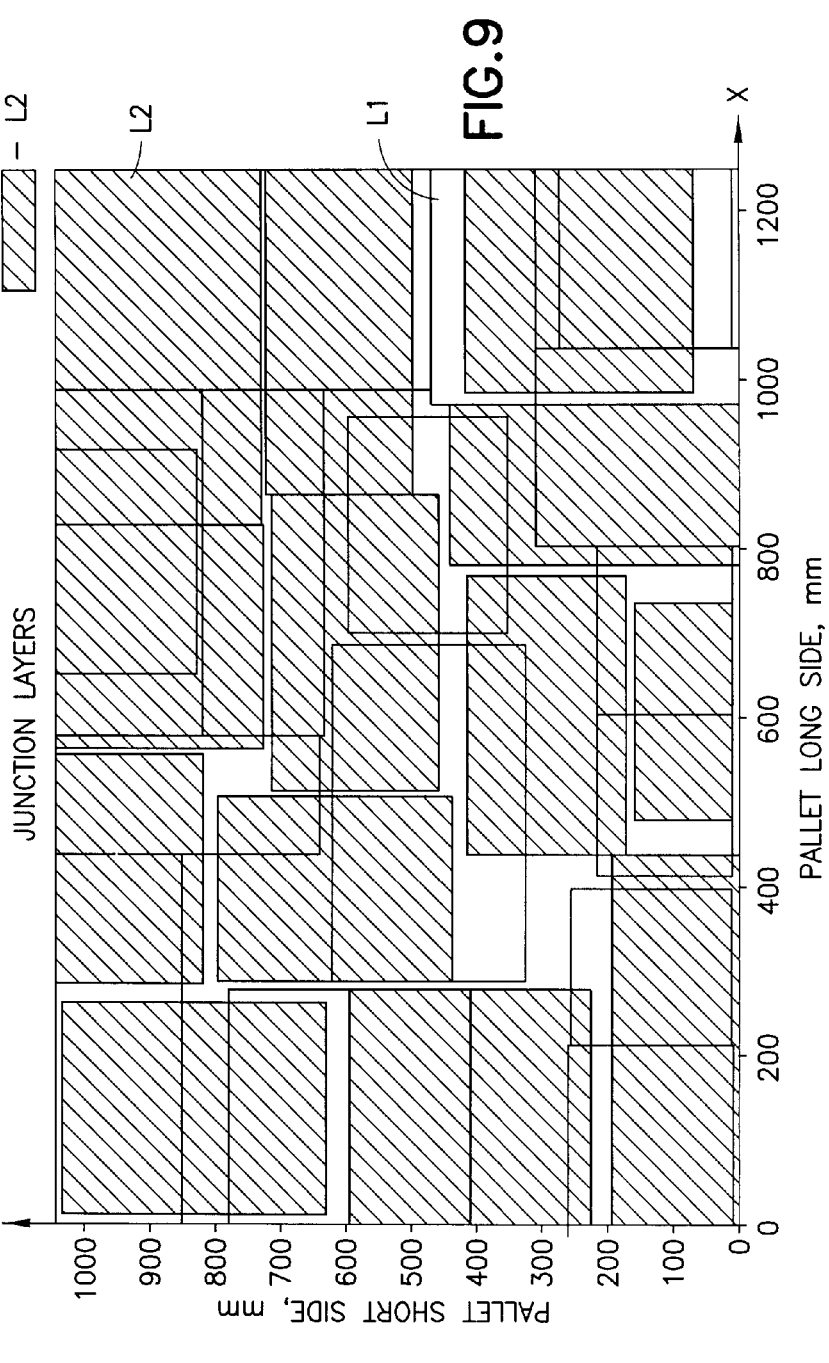

PALLET BUILDING SYSTEM

CROSS-REFERENCE TO RELATED APPLICATION

This application is a continuation of U.S. patent application Ser. No. 13/654,293, filed Oct. 17, 2012, which claims the benefit of U.S. Provisional Patent Application 61/548,105, filed Oct. 17, 2011, the disclosures of which are incorporated by reference herein in their entireties.

EARLIER RELATED DEVELOPMENTS

Retail distribution facilities or systems serve to facilitate transfer of merchandise, products (e.g. foodstuff, beverages, personal goods, household goods, cleaners, etc.) from manufacturers to retail stores (that may be traditional "brick and mortar" structures, or electronic/online stores). In high-volume retail channels, the case is generally the standard ordering unit for store-level replenishment for reasons that will be described below. The case may be any container that may be used for shipping and is filled with one or more product units at the manufacturer or producer, may contain the product units during shipping, and the product units may be removed from the case, such as for placement on shelves at a retail store location, or for consumer order fulfillment. The term "case" is used for description purposes herein and may be any suitable kind of case, container, or package that serves to directly hold one or more units during shipping, and may include by way of example, cartons, boxes, shrink wrapped trays, beverage container package, (either shrink wrapped or otherwise tied to form a package) and others that may generally have an approximate hexahedron shape. The cases have suitable structural characteristics that enable shipping the product unit(s) in cases disposed on pallets, where multiple cases are layered onto each of the pallets. As may be realized, manufacturers may ship products in what may be referred to as single point pallets or homogeneous case pallets (or otherwise in what may be referred to as "rainbow" pallets with different products arranged in homogenous product layers). However, the standard ordering unit for store level replenishment, as noted above, is the case (i.e. when replenishing stock, stores will order by the case, not the pallet), and hence the pallets desired for store replenishment are what may be referred to as mixed case or heterogeneous case pallets and not homogeneous case pallets. Accordingly, in order to effect store replenishment as desired, cases on homogenous pallets may be depalletized, sorted by replenishment order, and then repalletized into desired mixed case pallets, and this process may be effected, for example at and with the retail distribution facilities or systems. Such facilities may include depalletizers, material handling systems for transporting, storing, retrieving and sorting cases, and palletizers capable of generating mixed case pallets in response to store replenishment orders. As may readily be realized, store replenishment at the case level, and hence mixed case pallet deliveries to stores, offers various efficiencies to retailers. For example, sourcing and storing products based on demand, avoiding costs associated with sourcing and storing products via homogenous case pallets independent of demand. As may also be realized, combining the mixed or heterogeneous cases ordered for replenishment into pallets, thereby forming mixed case pallets, affords further efficiencies because transport or shipping between distribution facility and stores is generally by truck (or similar conveyance) and control of the ordered cases as well as loading and unloading is more effective and efficient if performed by pallet load rather than by individual cases. Nonetheless, though numerous (some simple, many automated and sophisticated) material handling, storage and retrieval systems have been developed. For accurate and efficient case order fulfillment a major determinant affecting efficiency of replenishment is the packing efficiency (as will be described below) of the mixed case pallets generated by the distribution facility. As may be imagined, it is desired that mixed case pallets be built up as efficiently as possible, yet this goal has proved elusive, especially in situations where the cases generally ordered for store replenishment are highly heterogeneous (such as, for example, in replenishment of supermarkets). In addition to efficiency, important factors include pallet stability, handling on crushable cases, and separation of food items from items potentially affecting food safety such as detergents.

Packing efficiency is a term used herein to help describe heuristically the "best" pallet build (e.g. high packing efficiency to a "load" pallet build). General desirable characteristics useful in defining such a high packing efficiency for pallet build may include for example that the pallet is:

high enough, to contain many cases and efficiently utilize available vertical space of a shipping truck;

dense, to contain as many cases as possible and allow efficient space utilization;

stable, to allow movement, shipping and handling without breaking down or toppling over;

enabled for automated pallet building using robots, which is more constrained and difficult than manual building (because humans can achieve cube density, stability, etc. through on-the-fly adjustments, either at a gross level by re-sorting the cases, or by minor adjustments in case placement);

be contained within specified dimensions (examples of pallet footprints used by the industry are 40"×48", 48×48"), and well-shaped in general (without large voids or protrusions) for convenient storage and shipping within a truck's hold;

safe for each case of produce—keeping packaging integrity of all cases, avoiding crushing or damaging their content; providing efficient weight distribution in each pallet, taking into account sturdiness of individual cases;

possibly store-friendly—to allow convenient unloading of cases inside a store, aisle by aisle, without excessive movement back and forth across aisles.

In addition to the above, there should be as few pallets as possible from a whole store order (again, to allow efficient utilization of the truck space and to minimize labor in shipping and handling).

As noted previously, various conventional systems and methods have tried to provide a solution, some in conjunction with sophisticated material handling, storage and retrieval systems. U.S. Pat. No. 5,175,692 to Mazouz, et al. describes a conventional method and apparatus for automatic palletizing parcels of various sizes, shapes, and contents, that arrive in random order at a pickup point for transfer to a pallet. The system includes a computer programmed to take information about attribute factors of the parcels and apply predetermined rules to assign a space for the parcel on the pallet, and communicates coordinates of the assigned space to a flexible material handling robot. In U.S. Pat. No. 6,286,656 to Huang et al. another conventional method and apparatus for palletizing rectangular packages received in random size and weight is described. A "corner" based modeling system is used to assist in evaluating possible placement of accumulated packages, and a placement evaluation processing used to select "best" package placement based on heuristic analysis. Statistically based measurement and comparison is used to assist in the evaluation. In U.S. Pat. No. 6,871,116 to Brust et al., describes yet another conventional method and system of determining pallet layers for placement of a material handling system robot. The system uses case dimension information of cases to be included in a pallet to classify the cases into groups defined by a height range such that cases classified within a group have a height within the height range associated with that group. Cases of one group can be assigned to locations within a pallet layer. In U.S. Pat. No. 7,184,855 to Stingel, III et al., another conventional storage and delivery system is described, which includes a palletizer for forming a group of containers into a layer or partial layer that is placed onto a pallet. An individual container placement station is also provided for placing individual containers onto the pallet. U.S. Pat. No. 7,266,422 to DeMotte et al., describes still another conventional method for stacking cases on a pallet including using case dimensions for determining available positions on the pallet where a case can be placed. Rules, including a full layer rule and adjacent height rule, for selecting a case for placement on the pallet are applied on a case by case basis to identify a selected case that satisfies at least one of the rules and a corresponding place on the pallet for the selected case.

Referring now to FIGS. 1A-1B, there is shown schematic perspective views of general mixed case pallets built by conventional palletizing systems. The pallet PYR shown in FIG. 1A may be referred to as a level layer pallet, wherein the pallet is built by placing cases one case level at a time (cases may be placed individually or in partial or whole layers as noted above until the level layer is complete before proceeding to the next level layer. The limitations of the conventional level layered pallet PyR are readily discernible from FIG. 1A, especially when considered with respect to a highly heterogeneous case order (i.e. finding sufficient cases of common height per level may prove difficult) resulting in a degenerative progression of layer levels and general pyramidal pallet build that is undesired. The degree of heterogeneity that may be encountered when building mixed case pallets, may be better understood from the curves shown in FIG. 1C. FIG. 1C is a graph illustrating the variation of case dimensions (e.g. length, height and width) within a representative population of cases such as may be found in the storage and retrieval system and used to generate the mixed case pallets according to customer replenishment orders. As may be realized, the orders may result in mixed case pallets including many cases with dimensions from disparate portions of the dimension spectrum illustrated in FIG. 1C. Another conventional build mixed case pallet UNS is shown in FIG. 1B and may be referred to as a stacked load pallet, wherein the pallet is loaded with cases in columns or stacks to the maximum allowable pallet height. Hence, again, the limitations of the conventional stacked load pallet UNS when attempted to be formed from highly heterogeneous cases are easily discernible from FIG. 1B. Cases within stacks rest on support surfaces of the underlying cases within the stack, and conversely the underlying case surfaces delimit the cases that may be placed above which is undesired. Relaxation of the limits on sizes of under cases has a detrimental and undesirable effect on pallet stability. The exemplary embodiment overcomes the problems of the prior art as will be described further below.

BRIEF DESCRIPTION OF THE DRAWINGS

The foregoing aspects and other features of the exemplary embodiment are explained in the following description, taken in connection with the accompanying drawings, wherein:

FIGS. 4A-4B are perspective views of different palletizer systems that may be included in the automated material handling system in accordance with the exemplary embodiment, and FIG. 4C is a perspective view of a representative pallet support and pallet load space envelope;

FIG. 9 is another schematic plan view illustrating overlay of at least two layers of the mixed case pallet load.

DETAILED DESCRIPTION

Figure 1A:
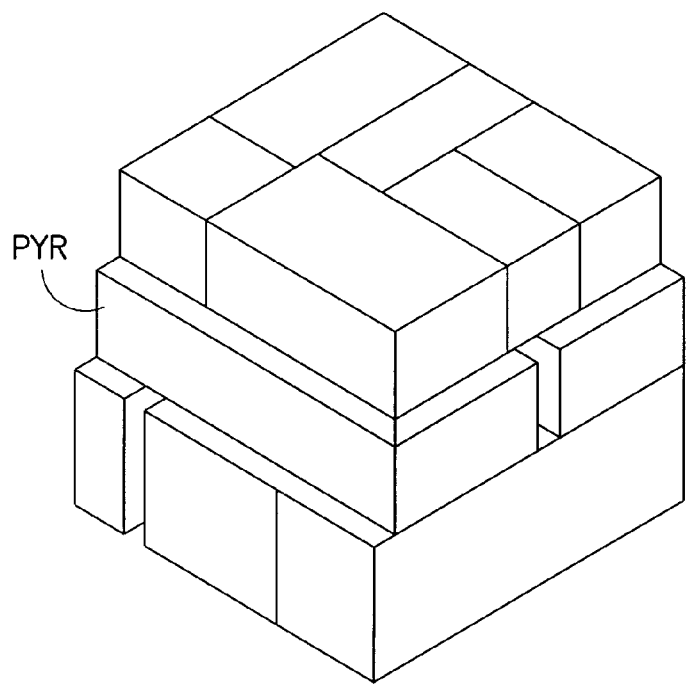
FIGS. 1A-1B are perspective views of conventional pallet load built in accordance with the prior art.

Although the present embodiments will be described with reference to the embodiments shown in the drawings, it should be understood that the embodiments can be embodied in many alternate forms of embodiments. In addition, any suitable size, shape or type of elements or materials could be used.

Figure 2:
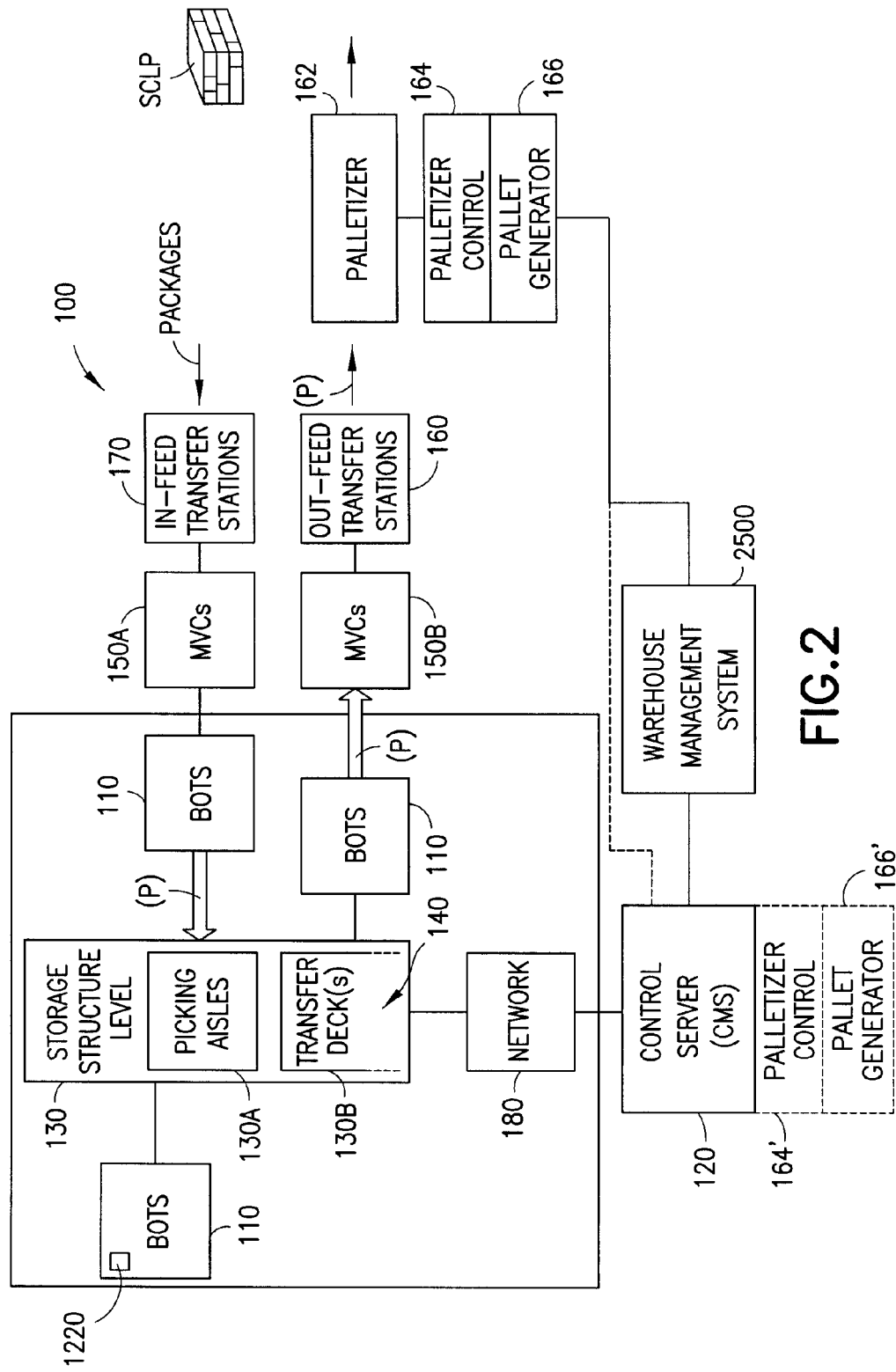
FIG. 2 is a schematic diagram of an automated material handling system for case storage and retrieval incorporating features in accordance with the exemplary embodiment.

FIG. 2 schematically illustrates a representative automated storage and retrieval system 100 incorporating features in accordance with the exemplary embodiment.

Figure 1B:
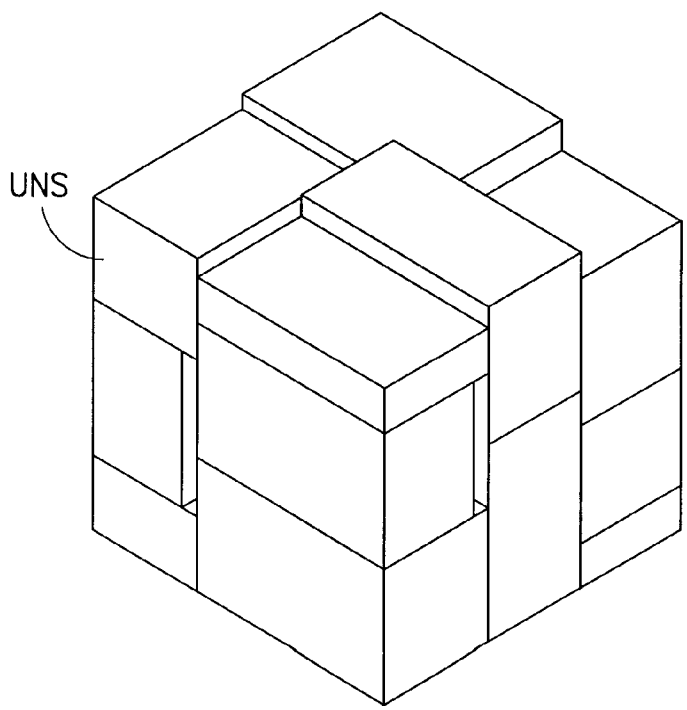
Figure 1C:
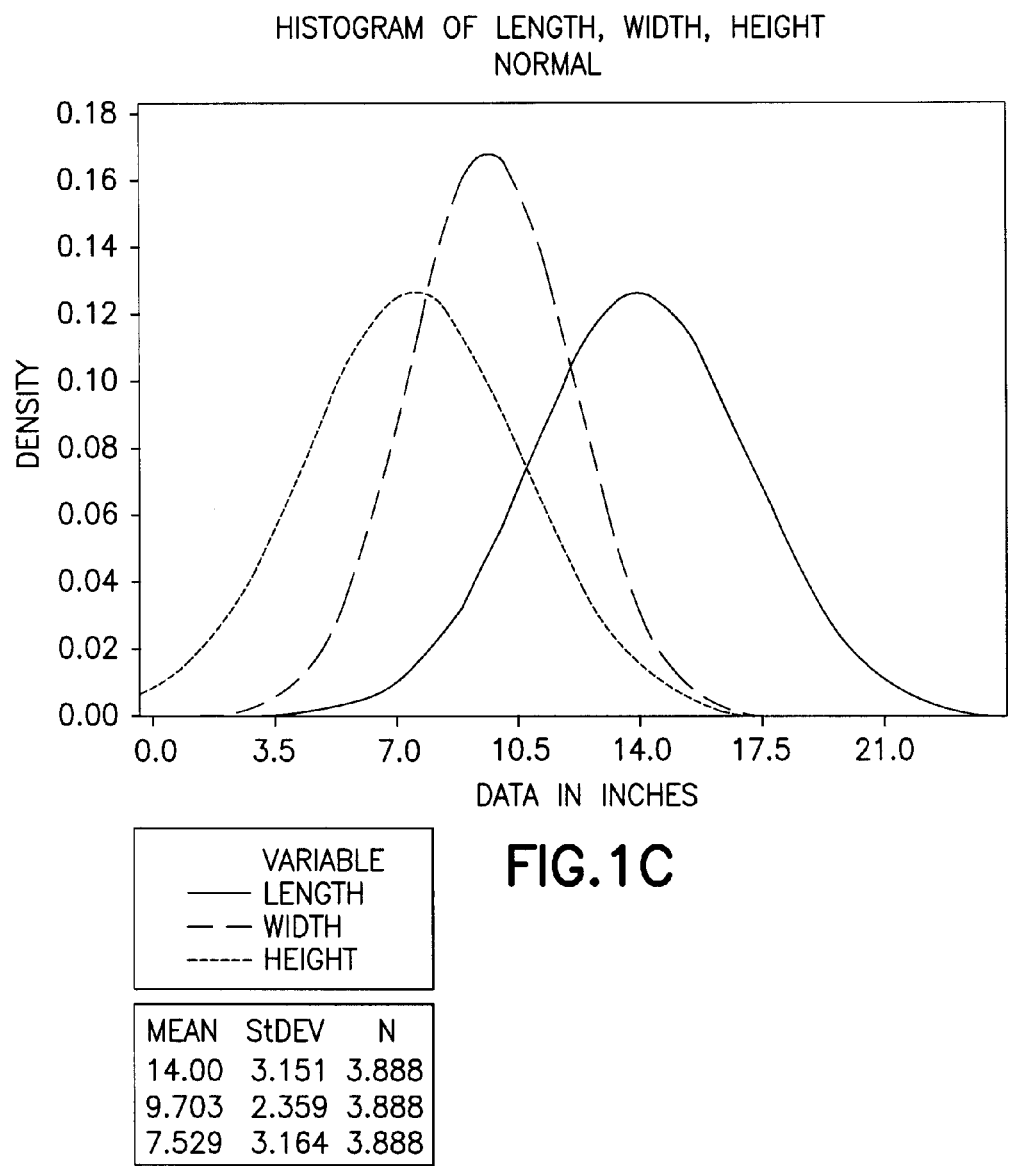
FIG. 1C is a graph illustrating the variation of case dimensions within a representative population of cases.

As noted before, the customary retail replenishment unit is the case, and in accordance with the exemplary embodiment, the automated storage and retrieval system 100 in FIG. 1, may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained). It is noted that the case units may include cases of case units (e.g. case of soup cans, boxes of cereal, etc.) or individual case units that are adapted to be taken off of or placed on a pallet. In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's. In the exemplary embodiment, the system 100 may be configured to generally include an in-feed section. A storage and sortation section and an output section. As will be described in greater detail below, the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads. The in-feed section may generally be capable of resolving the uniform pallet loads to individual cases, and transporting the cases via suitable transport, for input to the storage and sortation section. The storage and sortation section in turn may receive individual cases, store them in a storage area and retrieve desired cases individually in accordance with commands generated in accordance to orders entered into a warehouse management system for transport to the output section. The sorting and grouping of cases according to order may be performed in whole or in part by either the storage and retrieval section or the output section, or both, the boundary between being one of convenience for the description and the sorting and grouping being capable of being performed any number of ways as will be described further below. The intended result is that the output section assembles the appropriate group of ordered cases, that may be different in SKU, dimensions, etc. into mixed case pallet loads. In the exemplary embodiment, the output section generates the pallet load in what may be referred to as a structured architecture of mixed case stacks. The structured architecture of the pallet load may be characterized as having several flat case layers, at least one of which is formed of non-intersecting, free-standing and stable stacks of multiple mixed cases. The mixed case stacks of the given layer have substantially the same height, to form as may be realized substantially flat top and bottom surfaces of the given layer, and may be sufficient in number to cover the pallet area, or a desired portion of the pallet area. Overlaying layer(s) may be orientated so that corresponding cases of the layer(s) bridge between the stacks of the supporting layer. Thus, stabilizing the stacks and correspondingly the interfacing layer(s) of the pallet load. In defining the pallet load into a structured layer architecture, the coupled 3-D pallet load solution is resolved into two parts that may be saved separately, a vertical (1-D) part resolving the load into layers, and a horizontal (2-D) part of efficiently distributing stacks of equal height to fill out the pallet height of each layer.

In greater detail now, and with reference still to FIG. 2, the storage and retrieval system 100 may be configured for installation in, for example, existing warehouse structures or adapted to new warehouse structures. As noted before the system 100 shown in FIG. 2 is representative and may include for example, in-feed and out-feed conveyors terminating on respective transfer stations 170, 160, multilevel vertical lifts or conveyors 150A, 150B, a storage structure 130, and a number of autonomous vehicular transport robots 110 (referred to herein as "bots"). In alternate embodiments, the storage and retrieval system may also include robot or bot transfer stations (not shown) that may provide an interface between the bots 110 and the multilevel vertical conveyors 150A, 150B. The storage structure 130 may include multiple levels of storage rack modules where each level includes respective picking aisles 130A, and transfer decks 130B for transferring case units between any of the storage areas of the storage structure 130 and any shelf of any multilevel vertical conveyor 150A, 150B. The picking aisles 130A, and transfer decks 130B also allow the bots to place case units into picking stock and to retrieve ordered case units. In alternate embodiments, each level may also include respective bot transfer stations 140. The bots 110 may be configured to place case units, such as the above described retail merchandise, into picking stock in the one or more levels of the storage structure 130 and then selectively retrieve ordered case units for shipping the ordered case units to, for example, a store or other suitable location. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described as being dedicated inbound conveyors 150A and outbound conveyors 150B, in alternate embodiments each of the conveyors 150A, 150B may be used for both inbound and outbound transfer of case units/case units from the storage and retrieval system.

As may be realized, the storage and retrieval system 100 may include multiple in-feed and out-feed multilevel vertical conveyors 150A, 150B that are accessible by, for example, bots 110 of the storage and retrieval system 100 so that one or more case unit(s), uncontained (e.g. case unit(s) are not held in trays), or contained (within a tray or tote) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors generally, the multilevel vertical conveyors include movable payload supports that may move the case unit(s) between the in-feed and out-feed transfer stations 160, 170 and the respective level of the storage space where the case unit(s) is stored and retrieved. The vertical conveyor may have any suitable configuration, for example a continuously moving or circulating vertical loops or an otherwise reciprocating lift, or any other suitable configuration.

The automated storage and retrieval system may include a control system, comprising for example one or more control servers 120 that are communicably connected to the in-feed and out-feed conveyors and transfer stations 170, 160, the multi-level vertical conveyors 150A, 150B and the bots 110 via a suitable communication and control network 180. The communication and control network 180 may have any suitable architecture, for example may incorporate various programmable logic controllers (PLC) such as for commanding the operations of the in-feed and out-feed conveyors and transfer stations 170, 160. The vertical conveyors 150A, 150B and other suitable system automation. The control server 120 may include high level programming that effects a case management system (CMS) managing the case flow system. The network 180 may further include suitable communication for effecting a bi-directional interface with the bots 110. For example, the bots may include an on-board processor/controller 1220. The network 180 may include a suitable bi-directional communication suite enabling the bot controller 1220 to request or command and programming from control server 180 for effecting desired transport (e.g. placing into storage locations or retrieving from storage locations) of case units and to send desired BOT information and data including BOT ephemeris, status and other desired data, to the control server 120. As seen in FIG. 2, the control server 120 may be further connected to a warehouse management system 2500 for providing, for example, inventory management, and customer order fulfillment information to the CMS level program. A suitable example of an automated storage and retrieval system arranged for holding and storing case units is described in U.S. patent Ser. No. 12/757,220, filed Apr. 9, 2010 incorporated by reference herein in its entirety. Other suitable examples of automated storage and retrieval systems (ASRS) for storing and handling case units as described above and as otherwise shown in FIG. 2, to the extent applicable include the Multishuttle® System from Dematic Corp. and the Autostore™ system from Swisslog and ASRS systems from SSI Schaeffer.

Referring still to FIG. 2, in the exemplary embodiment the out-feed section of system 100, and more specifically out-feed transfer station and conveyors 160 extending therefrom serve to transport case units retrieved from storage to palletizer 162 as will be described in further detail below. The interface (not shown) between the out-feed section conveyors and palletizer 162 may have any desired configuration that facilitates substantially unimposed (with respect to output MTE of the system out-feed section) arrival of ordered case units and placement for unconstrained picking of the case units by the palletizer for building the mixed case pallet load SCLP. A palletizer controller 164 is provided to control operation of the palletizer. In the exemplary embodiment shown, the palletizer controller 164 may be a separate control server or processor (e.g. a PC) that may be communicably linked over a suitable network (e.g. network 180 or a different network) for bi-directional communication with the control server, and more specifically the CMS level programming of the controller 120. FIG. 2 further illustrates the case wherein the palletizer control 164' may be integrated into the system control server 120. Accordingly, as may be realized, the control level programming (effecting command for palletizer operation) as well as higher level palletizer programming, such as the pallet load generator 166, 166' (as will be described further below) may be resident on a common processing platform as the control servers 120 or a remote platform 164 as desired. As may be further realized, the palletizer controller 164, 164' may interface with the CMS program of the control server 120 for information on respective orders and case units used for example by the pallet generator in generating the pallet loads corresponding to the respective order. For example, information sought and provided by the CMS program to the palletizer control may include identification information for the respective orders to be filled, the sequence the orders are to be completed, the identification information (e.g. SKUs) of corresponding cases (e.g. which ones and how many) for the respective order, queuing information of cases initialized for retrieval and transport to the palletizer and changes thereto to the extent applicable dimensional data of the respective case and any other desired information. The out-feed section of the system 100 may include one or more inspection and/or dimensioning stations (not shown) where for example identity of cases corresponding to respective order may be confirmed, case dimensions (in 3-D) may be confirmed as well as case integrity and suitability for palletization. Such inspection station may be distributed within the out-feed section, or may be substantially a single station for example along the transport path of the out-feed section, or for example positioned proximate or adjacent the palletizer. Information from the inspection station may be communicated to the CMS program, such as for conformance confirmation of cases for a respective order, and resolution of any non-conformances. As noted before, such case information is further shared or transmitted to the palletizer controller 164 for use by the pallet load generator level program as well as programs governing palletizer motor control. If desired, the palletizer controller may be communicably connected to the warehouse management system 2500 for interface and transfer of desired information. In other aspects of the exemplary embodiment, inspection stations as noted above may be provided in the infeed section, or the case unit information identified thereby generated by any other suitable means and provided to the CMS program.

Figure 3:
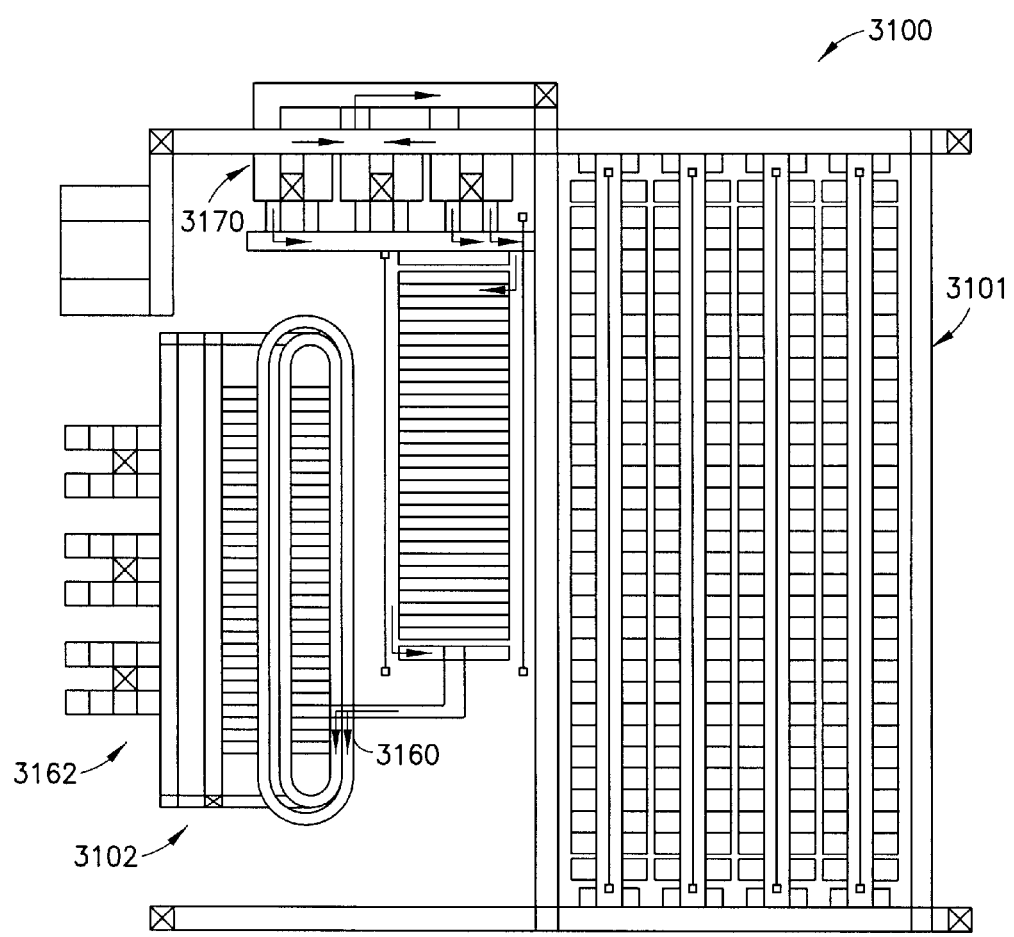
FIG. 3 is a schematic plan view of automated case storage and retrieval system.

Referring now to FIG. 3, there is shown a schematic view of another automated storage and retrieval system 3100 incorporating features in accordance with another aspect of the exemplary embodiment. In general, the storage and retrieval system 3100 is similar to the system 100 descried before and shown in FIG. 1, similar sections being similarly numbered. System 3100 is also illustrated as a representative system. The system 3100 may include an in-feed section 3170, storage arrays for case units and out-feed section 3160 terminating in palletizers 3162. The exemplary system 3100 may further include a pallet storage array 3101 where in-feed or uniform pallets (e.g. with uniform cases from producers) and if desired out-feed pallets with mixed case loads (similar to pallet SCLP in FIG. 2) may be stored until disposition. The pallet storage 3101 may be a 3-D array with pallet storage locations arrayed along rows at different levels as shown. Transport of pallet loads to and from storage locations in the array, may be by conveyors, lifts, cranes, automated vehicles, in combination or alone. The exemplary system 3100 has case unit storage array 3102 similar to the case storage of system 100 in FIG. 2. However, transport of case units to and from case unit storage in array 3102 may be via conveyors, (horizontal and/or vertical) or cranes, alone or in combination in lieu of. Similar to system 100, different case units corresponding to respective orders are picked from storage locations in the array and transported via the out-feed section to palletizers 3162 for assembly into pallet loads as will be described further below.

Figure 4B:
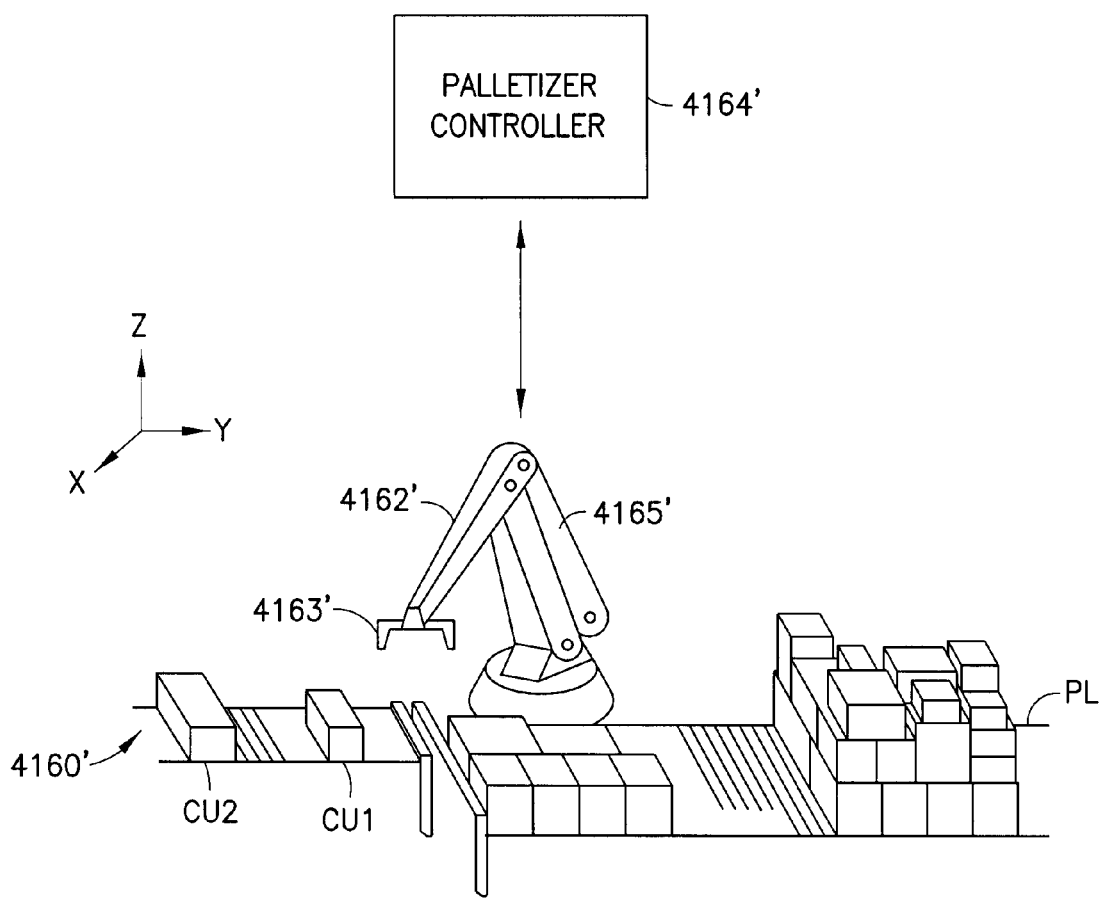

Referring now to FIGS. 4A and 4B, there is shown a palletizer or palletizing system such as may be used in palletizer(s) 162, 3162 in systems 100, 3100 described previously. FIGS. 4A and 4B respectively show examples of different suitable configurations of the palletizer for system 100, 3100. Generally the palletizer has a suitable effector or case grip 4163, 4163' to capture case units $CU_1$ $CU_n$ (n is a integer corresponding to the number of cases specified by the order) and move the case units from one location to a desired destination location for building the pallet load PL. In the exemplary embodiment, the case grip 4163, 4163' may be capable of 3-D movement (e.g. along x, y, z axis). The grip may be disposed accordingly on a suitable movable chassis 4162, 4162' with suitable drives to facilitate case grip motion as desired. By way of example, the palletizer 4162 shown in FIG. 4A may have a movable platform 4165 with the case grip 4163 depending from the platform. The platform may traverse on a support enabling the platform to move in a horizontal plane over a desired area (similar to a gantry system). The case grip 4163 may be mounted to the platform with an extendible member (e.g. enabling desired z motion of the case grip). By way of further example, the palletizer 4162' show in FIG. 4B may comprise an articulated arm 4165', the case grip 4163' depending from the arm. Here again, the arm articulation may be such as to allow desired range of motion of the case grip 4163' along the x, y, z axis. The configuration shown in FIGS. 4A-4B are exemplary, and in alternate embodiments the palletizer may have any other suitable configurations. Case grip actuation and movements, including path and trajectory between pick and place locations are determined and commanded by the palletizer controller 4164, 4164' in accordance with suitable programming. As may be realized, data related to the case grip picking the case units fed the palletizer by the out-feed section, including for example, case identification, dimensions, pick position or location may be provided by the system control server 120 (for example the CMS level program) to the palletizer control. Data related to case grip placement of the case units onto the pallet PL such as placement location (for example coordinate locations in the desired reference frames of the pallet load may be determined or provided to the palletizer control 4164, 4164' from the pallet load solution generated by the pallet load generator 166 (see also FIG. 2) in a manner and in accordance with programming features as will be described further below. As seen in FIGS. 4A-4B, cases $CU_1$-$CU_m$ corresponding to a respective order (initialized for example via the warehouse management system 2500 to the CMS level program for fulfillment) may be fed to the palletizer 1462, 1462' in a desired sequence. The exemplary configurations in FIGS. 4A-4B are shown as having a single out-feed conveyor transporting cases to the palletizer, but in alternate embodiments any suitable number of conveyors may be provided to feed the cases corresponding to a respective order to the palletizer. The term conveyor is used below to mean any suitable transport or conveyance capable of transporting the case units along a desired transport path, including for example a movable belt conveyor, roller or rotating bar conveyors or other suitable transport. As noted before, the case units $CU_1$, $CU_m$ are queued and placed as described previously on the feed conveyor(s) in a desired sequence and may arrive and be fed to the palletizer in the same sequence. The desired case sequence may be for example established or known to the control server (e.g. CMS level program) and communicated or otherwise shared, along with other CMS related information such as case identity and case dimensions, with the palletizer controller as also noted before. Information relating to the corresponding case units to the respective order may also be communicated to the palletizer controller. Hence, the palletizer controller may know the case units making up each respective order and case information (e.g. case dimension, identity, etc.) allowing determination of the pallet load structure with the pallet load generator. Further, the case information (e.g. case dimensions, identity) and feed sequence and determination of position of the case units for picking by the case pick of the palletizer. By way of example, as shown in FIG. 4B, the palletizer may operate to pick case units $CU_1$-$CU_n$ from the conveyor 4160'. The case units may be positioned by the conveyor in a desired location with respect to a reference datum, so that the position of the case to be picked by the palletizer is identified upon notification of case arrival at the desired location and if the case identity and case dimensions are known. As shown in FIG. 4A, the cases from the out-feed conveyor may be held in a buffer array (may be 1D, 2D or 3D) before being picked by the palletizer, the locations of respective cases in such buffer being known in a manner similar to that described above. As may be realized, the case pick sequence of the palletizer to build the pallet load PL may be decoupled from the sequence in which case units are fed (e.g. arrive at) the palletizer.

Figure 5:
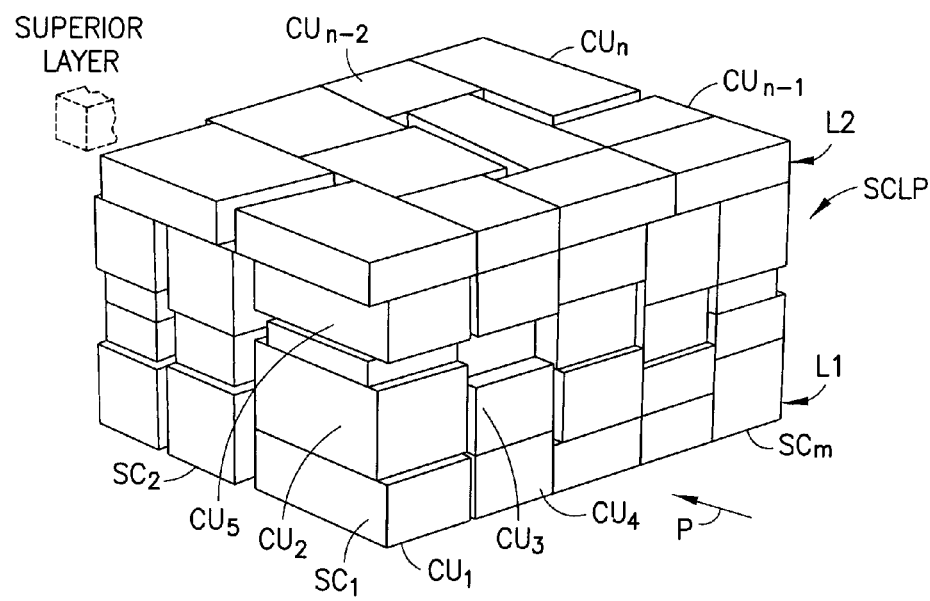
FIG. 5 is a perspective view of a representative mixed case pallet load incorporating features in accordance with the exemplary embodiment.
Figure 5A:
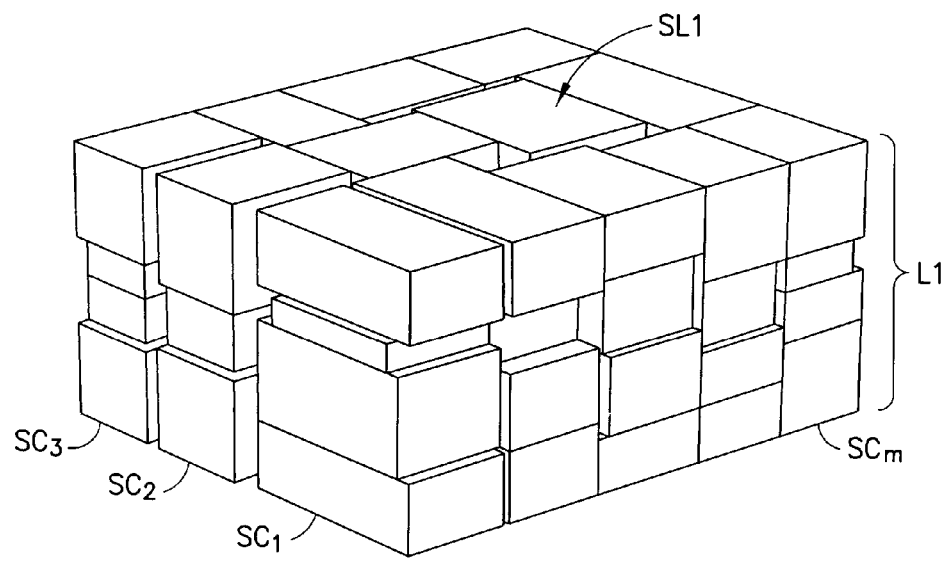
FIG. 5A is a perspective view of a first layer of the mixed case pallet load formed of mixed case stacks.
Figure 5B:
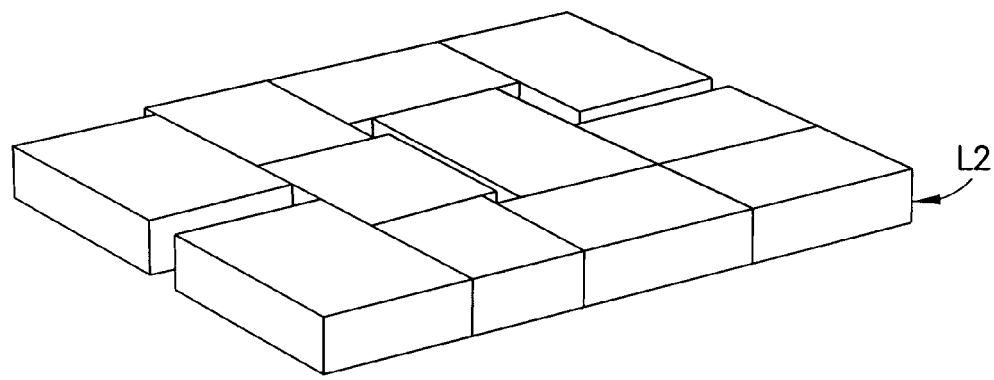
FIG. 5B is a perspective view of a second case layer of the mixed case pallet load.
Figure 5C:
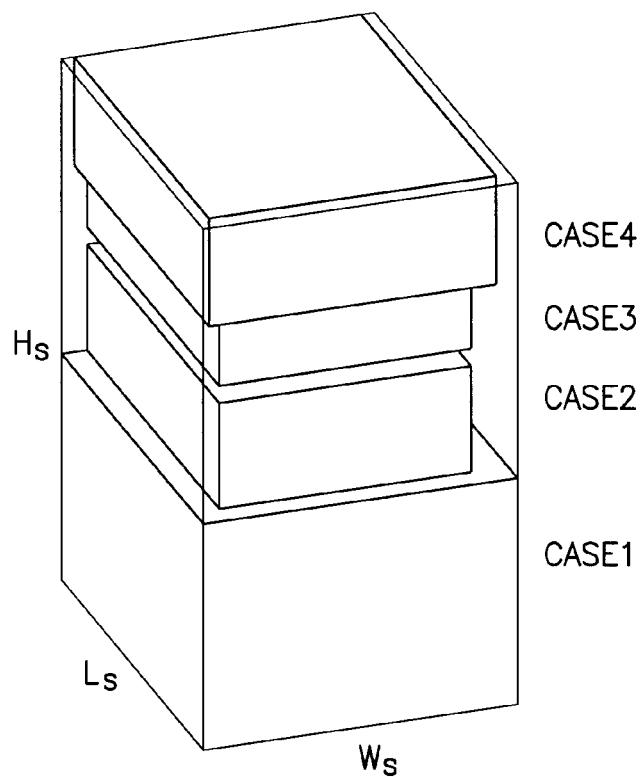
FIG. 5C is a perspective view of a representative mixed case stack of the composite stack layer in FIG. 5A.

Referring again to FIG. 2, the palletizer controller 164 may include a pallet load generator 166. In the exemplary embodiment, the pallet load generator 166 is shown for example purposes and ease of description as being resident on a common processing platform. As may be realized, the exemplary embodiment encompasses suitable configuration where the pallet load generator may be any suitable processor including a separate processor (proximate or remote) from the palletizer control. For example, the pallet load generator processors may be provided within the control server architecture. The pallet load generator is configured or otherwise programmed to determine the desired arrangement of the mixed cases in the pallet load SCLP, referred to herein as the pallet load configuration, for the respective order. The pallet loads of specific concern herein are those where the case units for building the loads are non-uniform or mixed case units (e.g. having different dimensions, including different heights). The mixed cases are queued and provided to the palletizer for building the pallet load(s) for a respective order as described previously. Referring now to FIG. 5, there is shown a perspective view of a representative pallet load SCLP built of mixed cases $CU_1$-$CU_n$ in accordance with the pallet load configuration determined by the pallet generally in accordance with features of the exemplary embodiment described in greater detail further below. As noted before, the configuration of the pallet load SCLP determined by the pallet load generator may be characterized or referred to as a structured layer architecture wherein the load, includes multiple layers L1, L2 at least one of which is made up of stacks $SC_1$-$SC_2$-$SC_m$ of mixed cases and the stacks are of substantially equal heights. The stacks $SC_1$-$SC_2$-$SC_m$ are arrayed in 2-D as will be described further below so that the layers L1, L2 cover the pallet frame at P or an area of the pallet frame. Lower layers L1, L2 which may support other layers, and hence may be considered to define seating surfaces for superior layers (in phantom) have top and bottom surfaces that are substantially flat. The representative load shown in FIG. 5 is illustrated as having two layers, L1, L2 for convenience and other pallet loads may have any desired number of layers. Though most mixed cases in the pallet load (for the respective replenishment order) have different dimensions (particularly different heights), the top and bottom surface of support layers L1, L2 may be formed, from the mixed case stacks, to be substantially flat such as for example within about a 3-5 mm variance across the layer. Accordingly, the stacks $SC_1$-$SC_2$-$SC_m$ of mixed cases forming a layer L1 may be of substantially equal heights with difference between stack heights within the aforementioned range for example. FIGS. 5A-5B respectively show the composite case layer L1 and layer L2 of the representative pallet load. FIG. 5C illustrates a representative stack formed of mixed cases as may be part of layer L1.

Figure 6A:
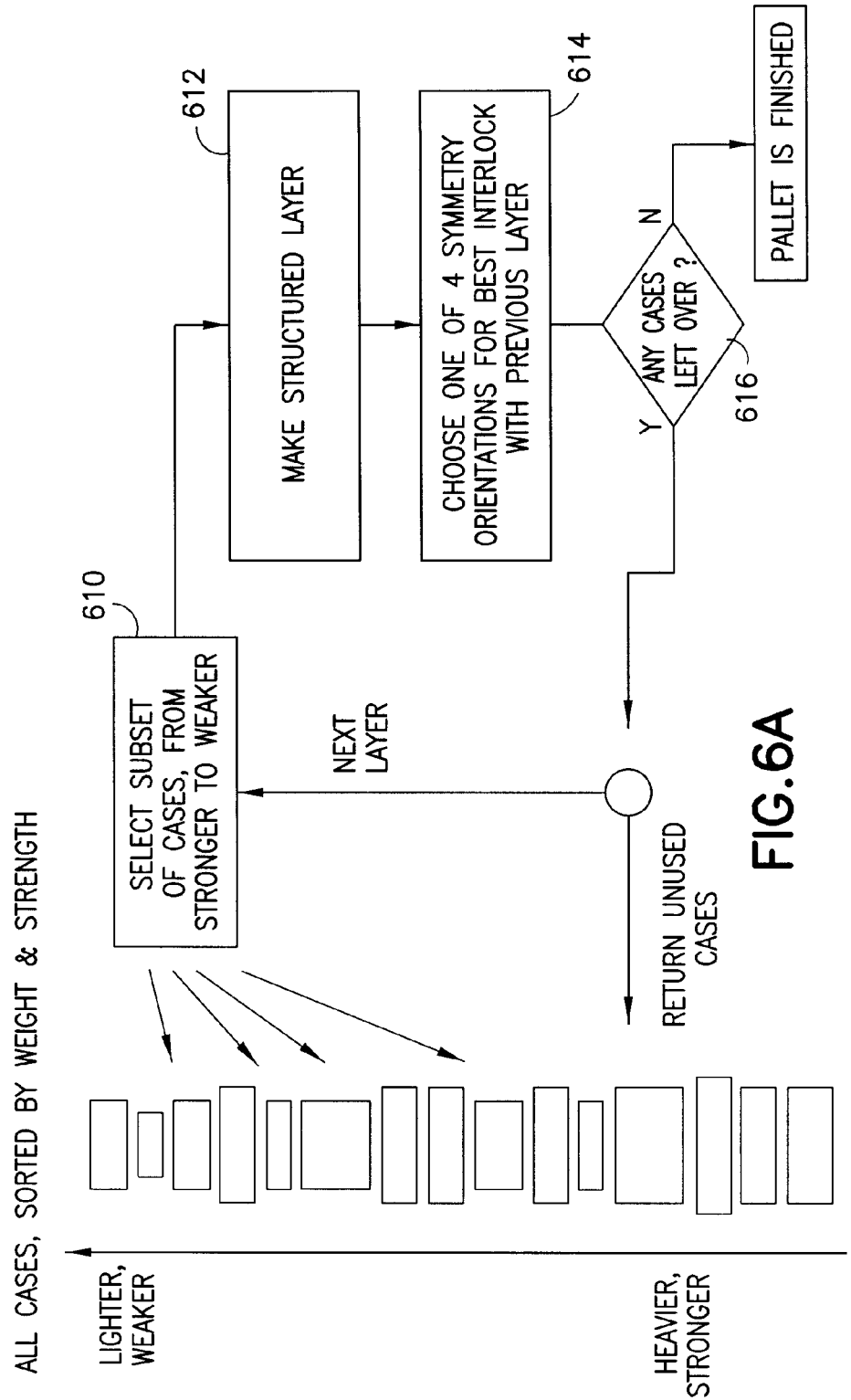
FIG. 6A is a block diagram graphically illustrating a process in accordance with the exemplary embodiment.
Figure 6B:
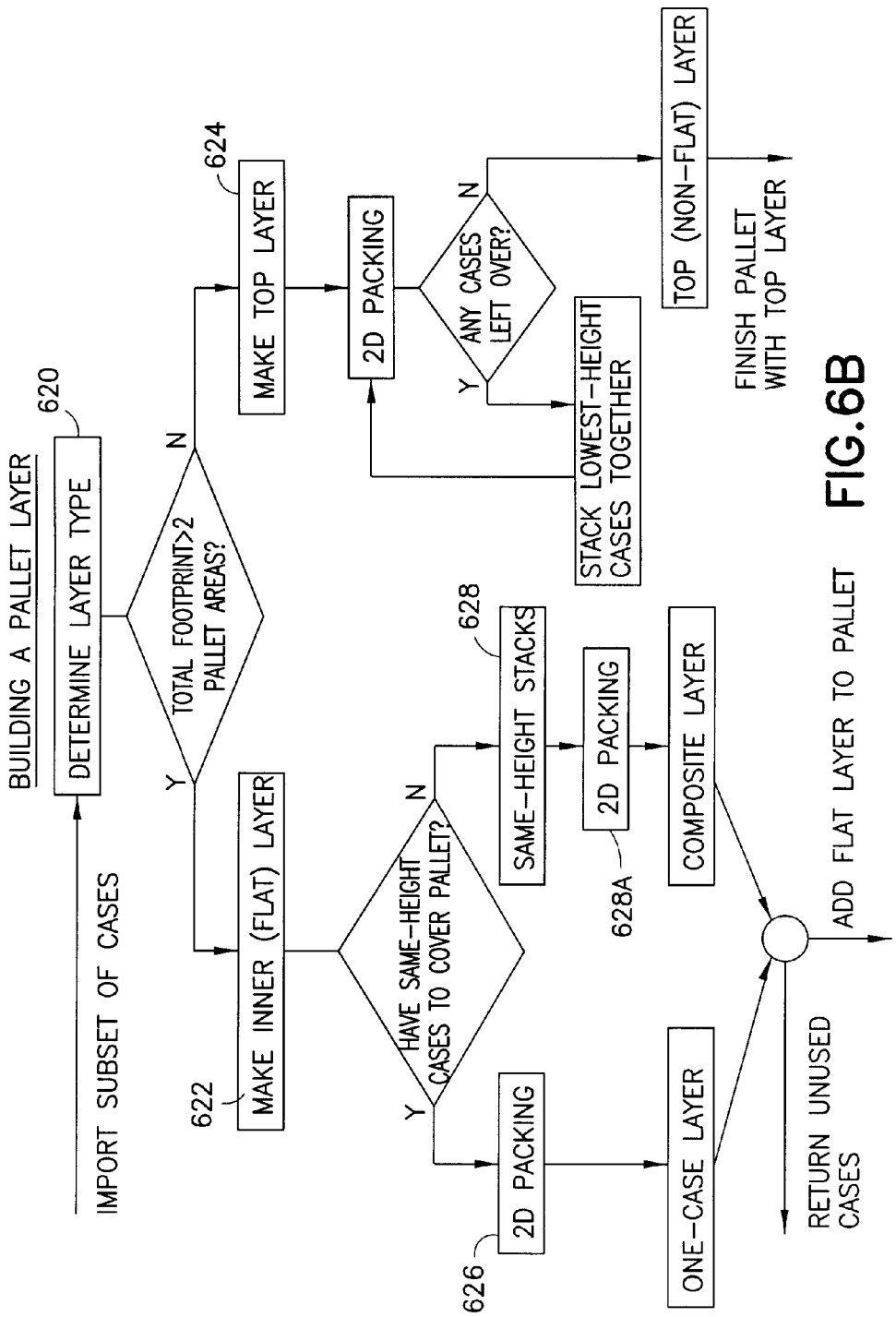
FIG. 6B is another block diagram further illustrating the process in accordance with the exemplary embodiment.
Figure 7:
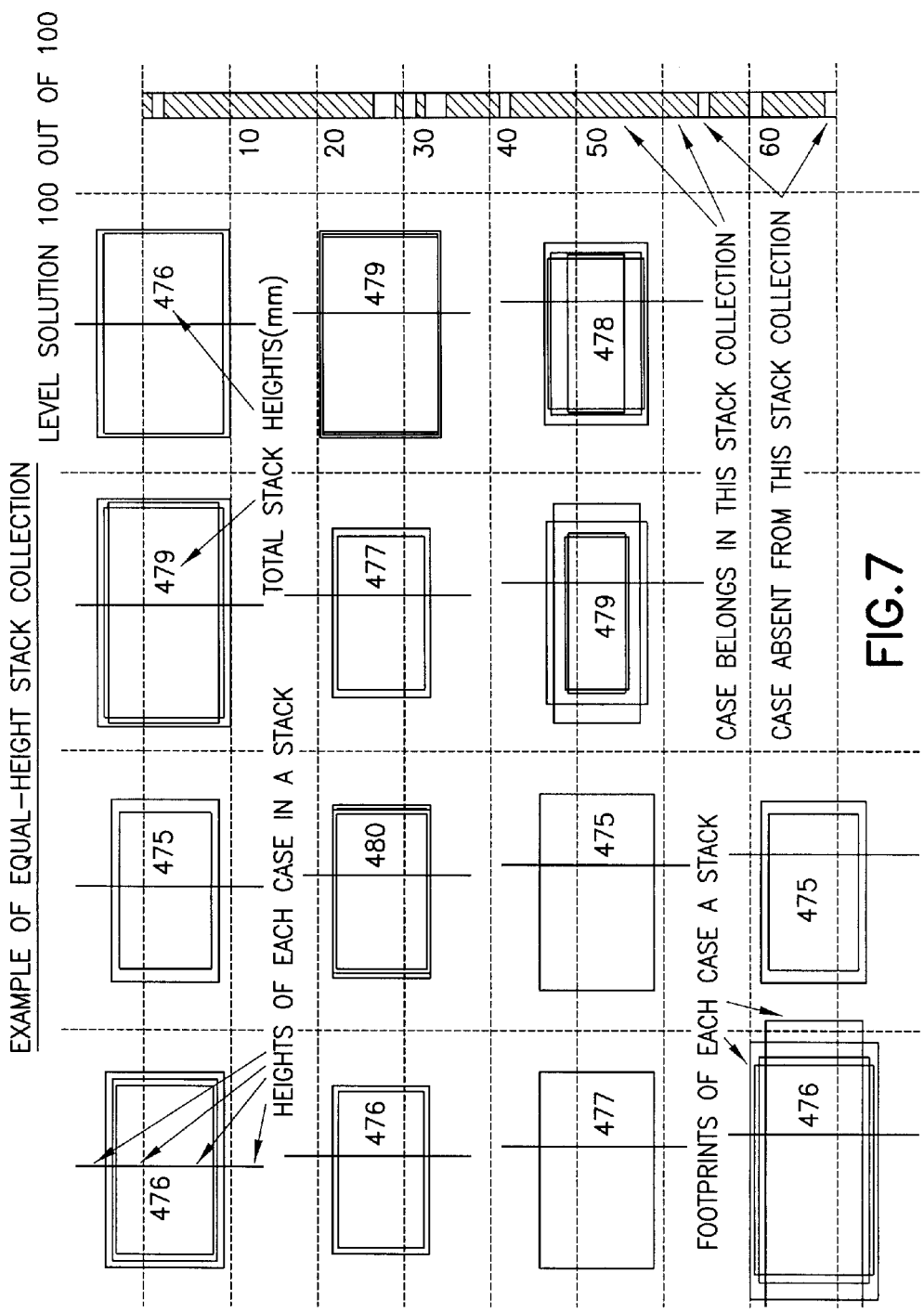
FIG. 7 is a schematic plan view of representative mixed case stacks of a composite stack layer illustrating a feature of the exemplary embodiment.

As noted before, the structured layer architecture approach incorporated in the pallet load generator for generating pallet loads SCLP allows reduction of the complex 3-D pallet load (bin filling) problem to a two part problem. The first part problem involves finding as many unique combinations of cases as desired, so that each combination, stacked vertically, may have substantially the same height. This stack height will define the layer height Lh. The second part problem is 2-dimensional, and involves packing, as densely as desired, stacks with rectangular horizontal dimensions (Ls(i), Ws(i)) within horizontal bounds of a pallet. In this case, the exemplary layers L1, L2 shown in FIG. 5 are formed of stacks, which may be formed of multiple mixed cases, such as for example shown in FIG. 5C. Also, as will be seen the stacks developed in the solution to the first part and usable for the solution of the second part are stable and non-intersecting when combined into a common layer L1, L2. Accordingly, the pallet load SCLP, may be built layer by layer wherein one or more of the layers (L1, L2) may be structured layers from bottom to top. As noted before, superior, non-supporting layers, such as a top most layer shown in FIG. 5, may not be flat. Referring now to FIG. 6A, there is shown a block diagram graphically illustrating a process for generating the pallet load SCLP in accordance with the exemplary embodiment. The pallet load generator 166 (see also FIG. 2), may be configured or suitably programmed to perform the process. The generator develops the pallet load solution relevant to the process which operates generally to define each flat layer L1, L2 in a sequential, layer by layer manner through an iterative approach. For example, each flat layer may be determined (i.e. the height of the flat layer) by finding sufficient number of non-intersecting sets of stacks (of mixed cases) where the stacks are of substantially equal heights (such as within the previously identified range). The sufficiency of the number of stacks may be established through comparison of the coverage provided by the total footprint of the sets of stacks with the pallet area. It is desired that the total footprint of the sets of stacks of each flat layer cover the pallet area. Subsequently the two dimensional packing of the respective layer may be effected by efficiently distributing the sets of stacks of the respective flat layer within the area corresponding to pallet length and width. Remaining cases unused in a respective layer are then used to generate each additional layers in a similar manner until the very top layer. Thus, in accordance with the diagram shown in FIG. 6A, the pallet load generator in block 610, may select subsets of cases, from the identified cases for a respective customer order, for determination of a pallet layer. FIG. 6B shows another block diagram graphically showing the pallet determination portion of the process (block 610 in FIG. 6A) in greater detail. The subset selection by the pallet load generator may be performed according to desired packing rules, for example having a predetermined distribution of stronger to weaker cases, or heavier to lighter, or a case distribution complementary to a desired off load protocol (i.e. protocol for off-loading the pallet and may be representative of a desired product mix in a layer). As seen in FIG. 6B, the selected subsets of cases may be evaluated for layer determination as per block 620. Subsets where the total footprint of cases is greater than a predetermined size (e.g. greater than pallet area) may be used for lower or inner layers, block 622. Subsets, such as those of remaining cases at the end of flat layer generation may not have sufficient total footprint and may be suited for formation of superior layers (e.g. non-flat top-most) 624. As seen from FIG. 6B, subsets including sufficient cases of the same height to cover the pallet may be separated to form a flat layer 626. The mixed cases subsets are used to generate flat layers of same height stacks of mixed cases, 628. The pallet load generator thus operates to identify a sufficient number of non-intersecting combinations of stacked cases that have substantially equal height (in the same range of about 5-6 mm). This may be done in an iterative manner for different number of cases in the stack. For example, the generator may compute the total height of all combination of four case stacks, and three case stacks, and so on. The stack heights may be identified for the combinations of any desired number of cases in the stack, including more than four cases and fewer than two cases. The combination of non-intersecting stacked cases may be grouped according to stack height increments of desired height range increments for example a base height and an incremental height step (h step) of about 3-5 mm. FIG. 7 illustrates an example of an equal height stack collection formed of various numbers of mixed cases. Further, within the height increment groups, the stack combinations may be sorted by what may be referred to as volume efficiency (i.e. the ratio of total volume of stacked cases to the product of max length, width and height LS, NS, HS, see FIG. 5C). As may be realized, stack desirability is directly proportional to the volume efficiency of the stack. The stacks in FIG. 7 are representative of stacks with desired volumetric efficiency (e.g. >90% efficiency). The height group(s) with the largest number of stack combinations having a sufficient number of non-intersecting stacks of desired volume efficiency may be set to form the inner flat layer, 628A and hence determine the flat layer height block, 612 in FIG. 6A. The layer may then be packed two dimensionally such as for example in a row by row process, see also FIGS. 8A-8B.

Figure 8A:
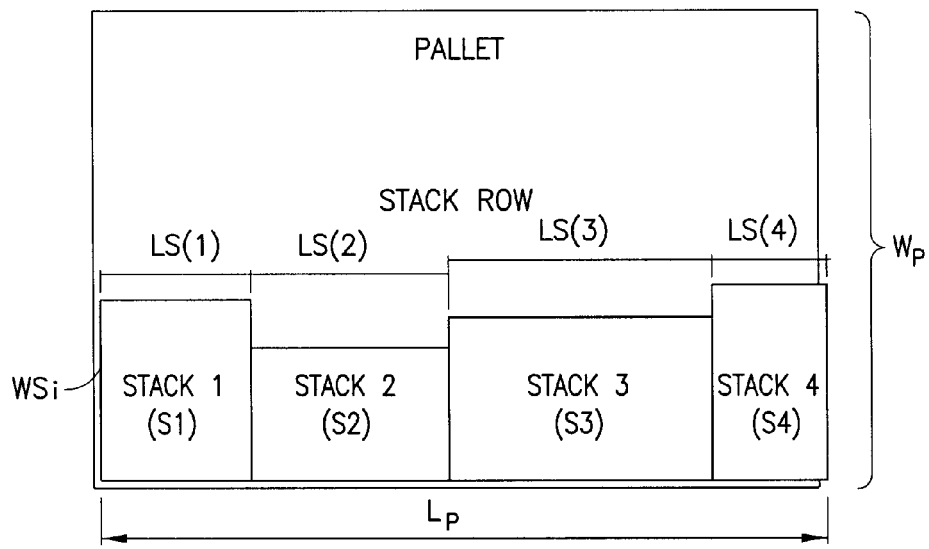
FIGS. 8A-8C are schematic plan views respectively showing different portions of a composite stack layer, and a whole composite stack layer.

The pallet load generator operates to fit as many stacks with various footprints Ls(i), Ws(i) within the horizontal area of the pallet of length and width Lp, Wp (see FIG. 8A). Accordingly, this may be effected by treating the packing in dimensions X and Y separately (e.g. a row by row approach). The generator may find all combinations of stacks which, when put side by side, will closely match length of the pallet Lp, or just less it with some margin. Such combinations can include both lengths and widths of different stacks, e.g. satisfying the equation.

$$Ls(1)+Ls(2)+L_s3)+Ls(4)=Lp-e, \quad \{1\}$$

Where $L_s(n)$ refers to the longitudinal dimension of the stack (that may be either stack length or width) in the direction of pallet length $L_p$ and e is small.

Figure 8C:
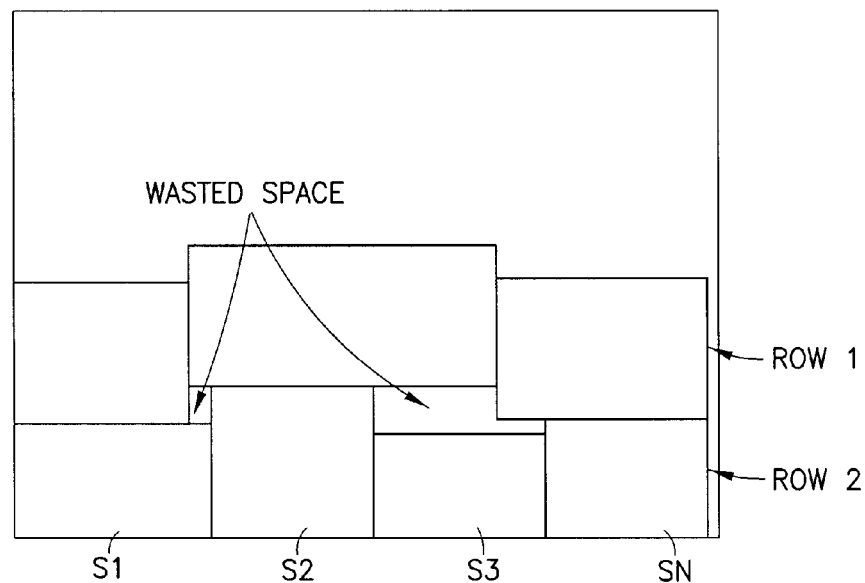
Figure 8B:
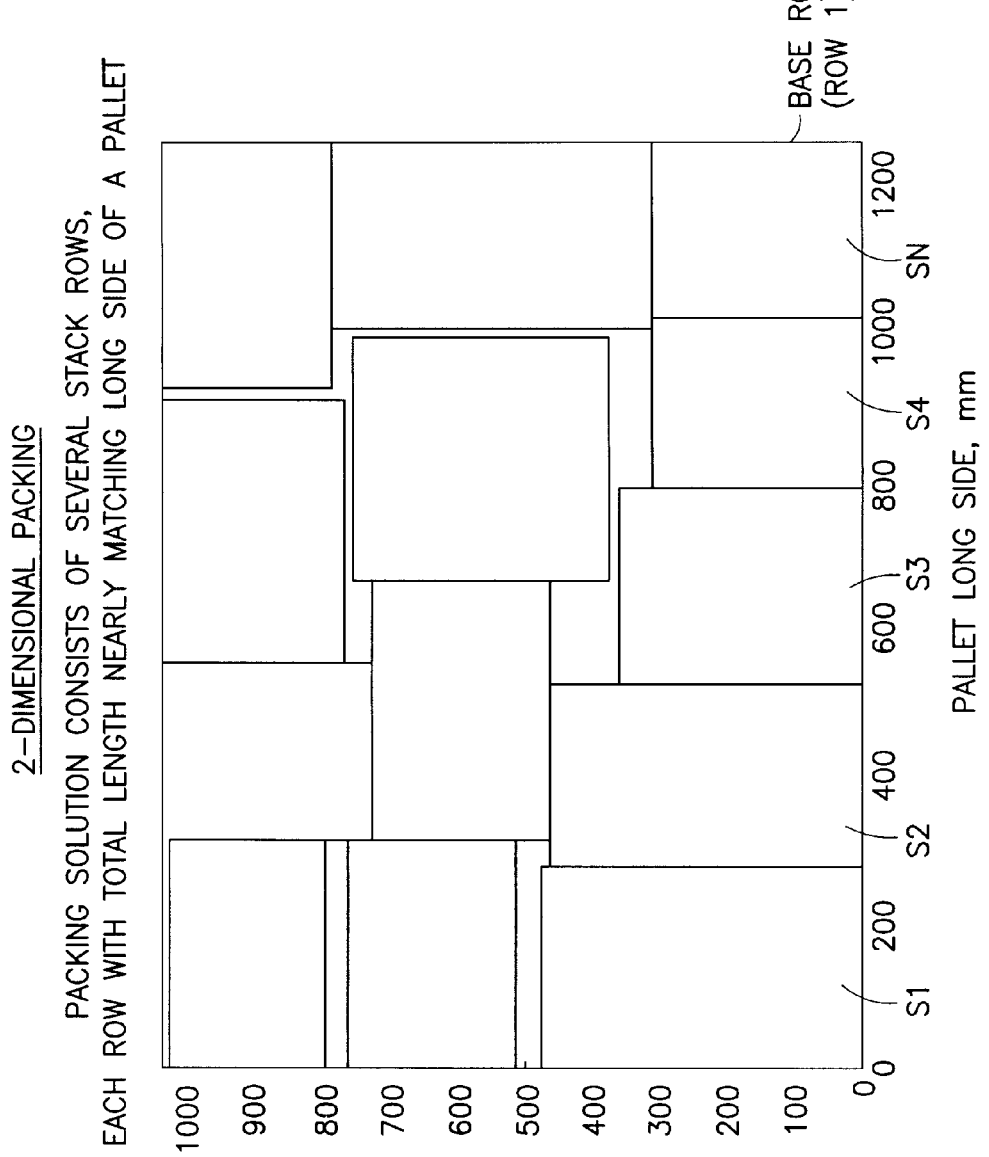

The generator may sort such combinations by total length for example in descending order from Lp to Lp-e1, where e1—specified maximal gap. The first combination (closest to overall length Lp) may be used to define a desired base (i.e. first) stack row along the long side of the pallet (see FIG. 8A). Following stack rows may be fit serially (one by one) adjacent each other commencing with the base row (row 1), along the width of the pallet to form a desired fit (see FIG. 8B). Different permutations of left-right sequence within each case row (row 1, row 2, . . . etc., see also FIG. 8C) may be reviewed to improve packing density (e.g. for stacks s1 . . . s4 . . . sN use permutations (s1, s2, s3, sN), (s1, s1, sN, s3) . . . (sN, s3, s2, s1), etc. When combining arrangements of two stack rows adjacent to each other, different permutations may be employed to minimize wasted empty space between stack rows, illustrated in FIG. 8C (as may be realized the number of stacks and rows shown in the aspects of the embodiment illustrated in the figures are exemplary, and in other aspects the number of stacks and rows of each layer may be as desired). Non-fitting stacks may be excluded from the pack solution, and disposed to fit individually in leftover space or used in packing other substantially flat layers in a similar manner to that previously described. As may be realized from the preceding, the top and bottom surfaces SL1 (see FIG. 5A) of the composite (mixed case) layer L1, L2, formed by the top and bottom surfaces of the respective stacks (SC1-SC$_n$) corresponding to the given layer, is flat substantially uniform and level surface extending over more than one (and substantially all) of the respective stacks in the layer. Thus, the top surface SL1 may serve as a stable seating surface over more than one stacks of the layer, enabling stable seating of the overlaying layer (and more discretely of the cases and/or stacks forming the overlaying layer). Conversely, the bottom surface of the composite layer offers a similar uniformally level seating surface (at top surface SL1) spanning under the more than one stacks of the layer for stable seating of the stacks and cases of the layer on a support surface. Overlaying layers (e.g. layer L2 in FIG. 5) may be oriented as desired so that stacks forming the layer bridge over independent stack of the underlying supporting layer L1 and thus interlock the lower layer L1. This is illustrated in FIG. 9. As may be realized, the interlocked stacks within an underlying supporting layer L1 are very stable. Further, this process is repeated at the interface between each successive layer so that each support layer has interlocking at both top and bottom interfaces.

Each layer L1, L2 can have 4 symmetrical positions with the same geometric structure: 1) Original, 2) Flip around X-axis, 3) Flip Y axis, 4) Flip XY (equal to 180 deg rotation relative to original). Each flip position of both layers may be verified for identification of better interlock of the lower layer. Upon sufficient resolution of the solution, suitable information as to case unit placement may be provided to the palletizer controller to generate the desired motions and build the pallet load from the cases.

Referring again to FIGS. 5-5C, in accordance with another aspect of the exemplary embodiment the non-intersecting stacks SC1-SC$_n$ forming the corresponding composite Layer L1, L2 may be freestanding substantially independent of adjoining stacks of the composite layer. In accordance with yet another aspect of the exemplary embodiment, each stack of the given composite layer L1, L2 may be free-standing substantially independent of adjoining stacks. Such substantially independently free-standing stacks, for example the stack illustrated in FIG. 5C, may be referred to as a stable stack. The stack may be considered to be stable if resistant to toppling or collapse when subjected to expected contact such as may occur for example during build of the stack, composite layer or pallet load by the palletizer. Stack stability appears to be generally related to stability of each case level and the stability of each interface between case levels (e.g. case 1-case 2, case 2-case 3 . . . , FIG. 5C), though an increase in number of case levels of the stack (or the height of the stack) relative to stack foot print (a relationship that may be otherwise referred to as aspect ratio) has an adverse influence on stack stability. In the exemplary embodiment shown in FIG. 5C, the stack is stable, with each case level (case 1-case 4) thereof and each level to level interface being stable. Each case level of the stack has a case that is in itself stable (e.g. the case height is generally commensurate with case width (min. footprint dimension) so that an aspect ratio (AR) thereof is generally equal to or less than one). Each case level (case1-case4) of the exemplary stack shown in FIG. 5C is not readily subject to toppling or collapse if jostled by contact during build of the pallet load. In the example shown in FIG. 5, each case level has but one case. In other aspects of the exemplary embodiment stable stacks may have stable case levels that may be formed of more than one cases arrayed alongside each other at a common case level of the stack, and may include narrow or unstable case units as will be described further below.

Figure 11:
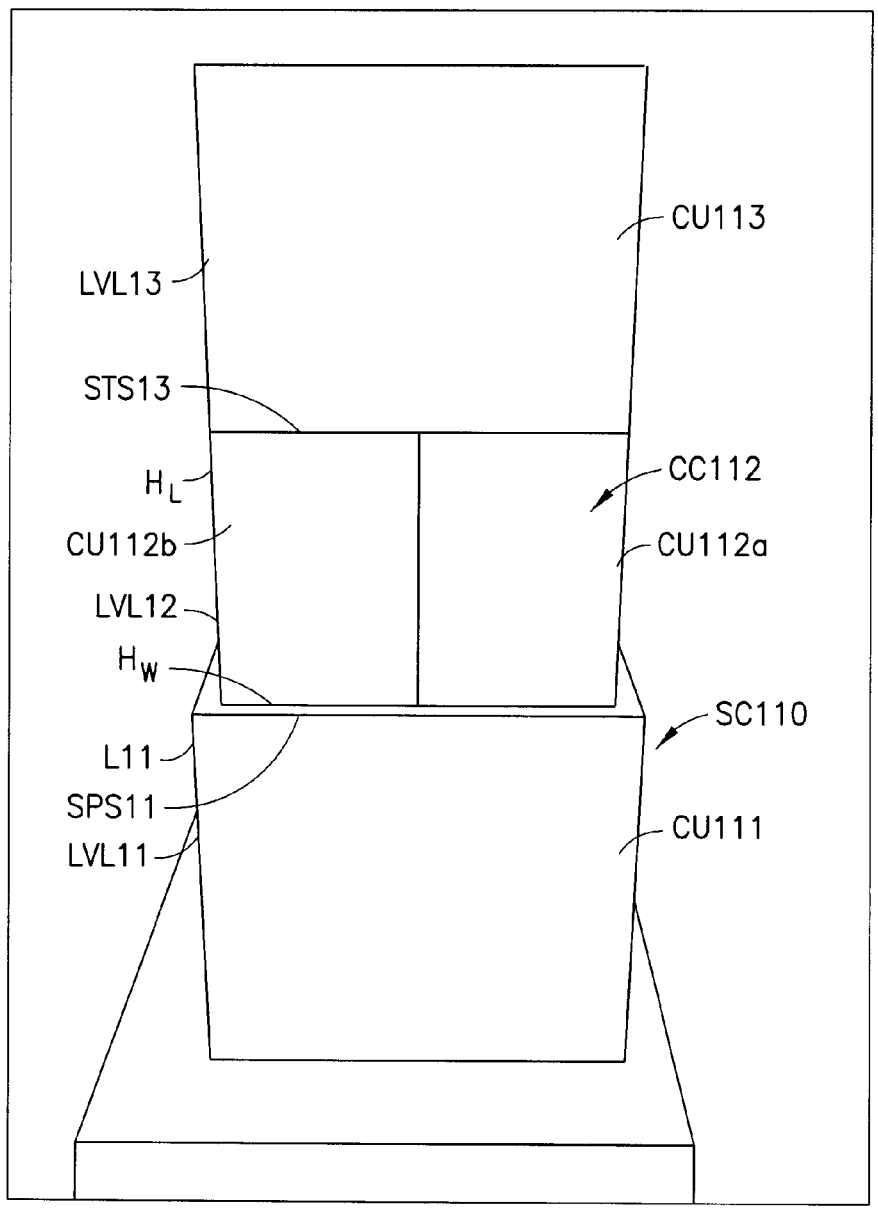
FIG. 11 is a schematic perspective view of a mixed case stack including a narrow case.
Figure 12:
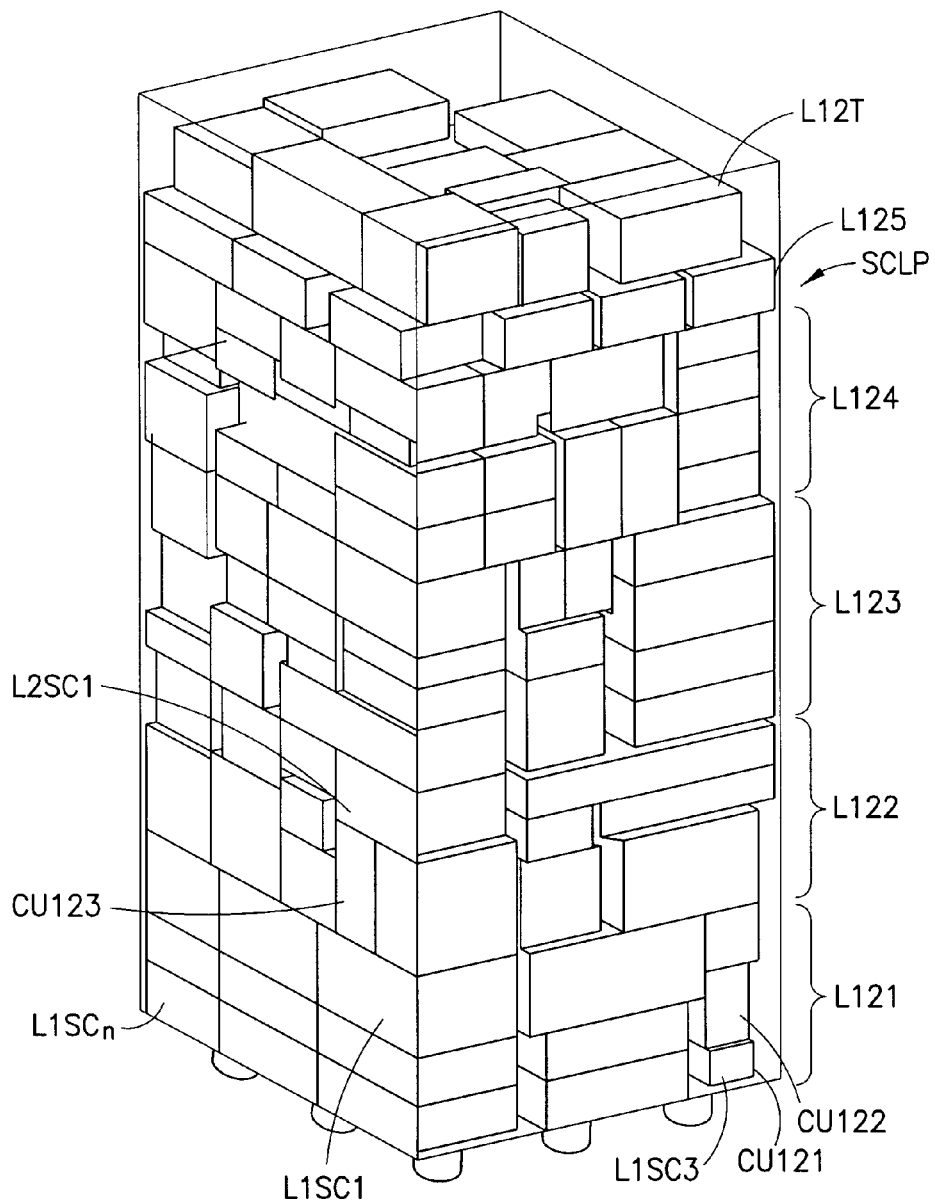
FIG. 12 is a schematic perspective view of a mixed case pallet load with mixed case layers including narrow cases.

As may be realized, customer fulfillment orders are not limited to stable packages, case or case units and may include a number of what may be referred to as narrow or unstable packages or cases that may be incorporated into the pallet load SCLP (see FIG. 2 and also FIG. 12) generated by the automated palletizer 162 of the automated storage and retrieval system. Converse to the stable cases described before, unstable cases may be generally described as tall and narrow cases (e.g. generally case dimensional properties of case height being significantly larger than width so that the case aspect ratio (AR) is substantially larger than one) and so are easily susceptible to toppling when subjected to incidental contact such as expected during automated build of the pallet load. Still, and with reference now to FIG. 12 (which is a schematic perspective view of a mixed case pallet load), in accordance with a further aspect of the exemplary embodiment, unstable cases may be included within the composite mixed case layer(s) of the pallet load SCLP. The composite mixed case layers L121-L124 of the pallet load SCLP shown in FIG. 12 may be similar to the composite layer(s) L1 described previously and shown in FIGS. 5-5B, but one or more of the mixed case composite layers (e.g. L121-L122) of the pallet load in FIG. 12 may include a number of unstable case(s) CU121, CU122, CU123 as will be described further below. Similar to case layer L1, case layers L121-L124 are formed of stable, non-intersecting stacks (e.g. free standing and independent of adjoining stacks in the corresponding mixed case layer). The top and bottom surfaces of the layers L122-L124 (formed by the tops and bottoms of the respective stacks in the corresponding layer (e.g. for layer L121, L1SC1-L1SC$_n$)) are substantially flat, uniformly level surfaces extending over/under more than one of the stacks and facilitating a stable seating surface for the overlapping layer(s). As noted above, the stacks forming the mixed case layers L122-L124 are stable, non-intersecting stacks and may include unstable cases in their construct. Referring now also to FIG. 11, there is shown a schematic perspective view of a representative stack SC110 corresponding to a representative mixed case layer L11 (similar to mixed case layers L121, L122 of the pallet load shown in FIG. 12). Stack SC110 is a stable stack (as described previously) and includes unstable cases (e.g. cases CU 112$a$, 112$b$ that are tall and narrow $H_1$>>$H_w$ as generally shown in FIG. 11). As may be realized from FIG. 11, each case level LVL 11-LVL 13 of stack 110 is stable as are the interfaces between the case levels. In the exemplary embodiment shown, case levels LVL 11, LVL 13 may each be formed of a single stable case CU111 (for LVL 11), CU113 (for LVL 13). Case level LVL 12, is disposed between case levels LVL 11, LVL 13 and may be formed of more than one unstable case 112$a$, 112$b$, (though two cases are shown, in other aspects there may be more or fewer cases) arrayed alongside each other (e.g. side by side) and may be considered to form composite or structured cases CC112. The structured case CC112 may correspond to a given case level LVL12, and forms a stable case level in the stack with stable level to level interfaces. As seen in FIG. 11, the structured cases 112 is formed and disposed at a case level LVL 12 that enhances level and hence stack stability. Accordingly, the level LVL 11 of the stack supporting the structured case CC112 provides a stable support surface SPS11 (such as may be provided by a single case CU111) for each narrow case 112a, 112b forming the structured case and case level LVL112. Also, the level LVL 13 immediately overlaying the structured case at level LVL 112 bridges a single case CU 113 across the narrow cases 112a, 112b forming the structured case. Thus, the structured case CC 112 is sandwiched between stable contact surfaces (respectively provided by the support and immediately overlaying levels of the stack) which effectively ties the individual narrow cases to each other with resultant stability of the structured case, of the level LVL 112 of the stack where the structured case is disposed and of the stack SC110 itself. The stable support surface (such as SPU11) and stable seating surface (such as STU13) that sandwich the narrow case may enable generation of a structured case having a single narrow case if desired (see also FIG. 12, stack L1SC3). As may be realized, stack packing efficiency criteria applied for selection of stacks in the mixed case layer as described before, may be relaxed (e.g. <90% efficiency) in the case of formation of stable stacks with narrow cases. The stability parameters as noted above may be embodied into rules programmed in the pallet generator 166 (see FIG. 2) used for pallet load generation to fulfill a customer order as will be described further below. The resultant stable stack(s) L11 thus provided may be considered for purposes of formation of the mixed case pallet layer as equivalent to or fungible with other stable same height stacks. Accordingly, the stack L11 (and similar stacks L1SC3, L2SC1) including the structured case(s) (of narrow case(s)) may be positioned as desired within the mixed case layer L121, L122, and the mixed case layers including such stacks may be positioned, or permuted over each other, as desired in the pallet load as previously described. The stack L11, L1SC3, L2SC1, may be in a bottom layer L121, or one of the overlaying layers L122-L124 of the pallet load without adverse impact to stability of the pallet load.

Figure 10A:
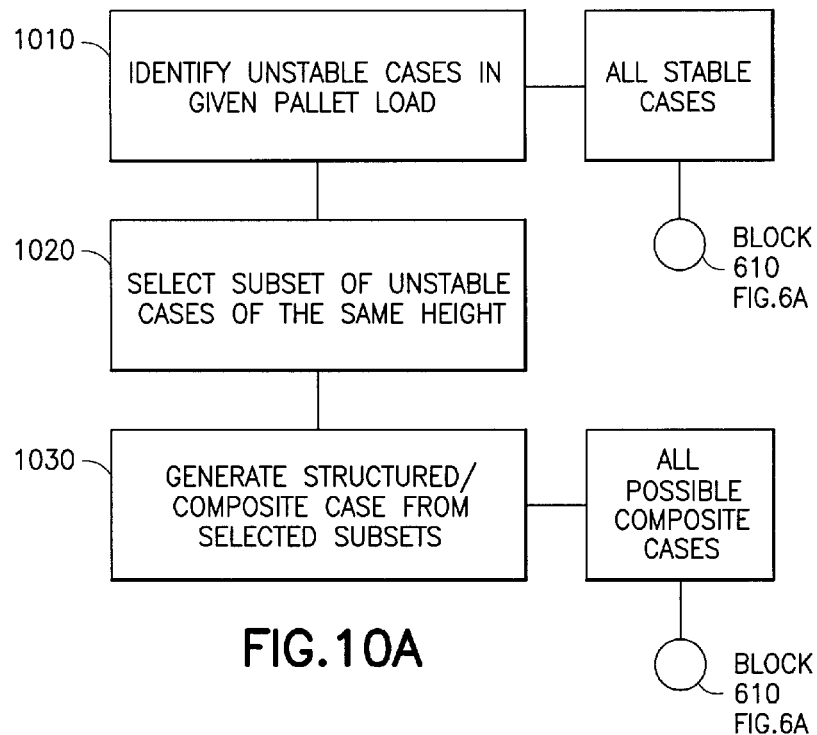
FIGS. 10A-10C are block diagrams respectively illustrating different portions of a process in accordance with an aspect of the exemplary embodiment.

Generation of the pallet load with narrow cases is performed by the pallet load generator and is generally similar to that described previously with respect to FIGS. 6A-6B. The pallet load generator is further programmed to resolve narrow cases (e.g. CU112a, 112b, CU121, CU123 in FIGS. 11, 12) into the pallet load. Referring now to FIG. 10A, there is shown a block diagram graphically illustrating further processing features in generation of the pallet load with narrow cases, which may be performed in conjunction with the process shown in FIGS. 6A-6B. The pallet load generator 166 (see also FIG. 2), may be configured or suitably programmed to perform the process. Accordingly, after registration of the customer order and initialization of the pallet load generation process fulfilling such order, the pallet load generator in block 1010 may operate to identify stable and unstable (narrow) case(s) in the fulfillment order and prospective pallet load. Processing of stable cases may then proceed according to block 610 in FIG. 6A. The pallet load generator may operate in block 1020 of FIG. 10A to select subsets of narrow cases having the same height and generate virtual structured cases with subsets of narrow cases. For each subset of cases of the same height, different virtual structured cases may be formed, each having different numbers of narrow cases, block 1030, (e.g. a virtual structured case may be formed with one narrow case (such as when the case is nearly stable), another virtual structured case with two narrow cases, and another with three, up to a desired limit that for example may be dependent on the extent of case instability or otherwise case aspect ratio).

Figure 10B:
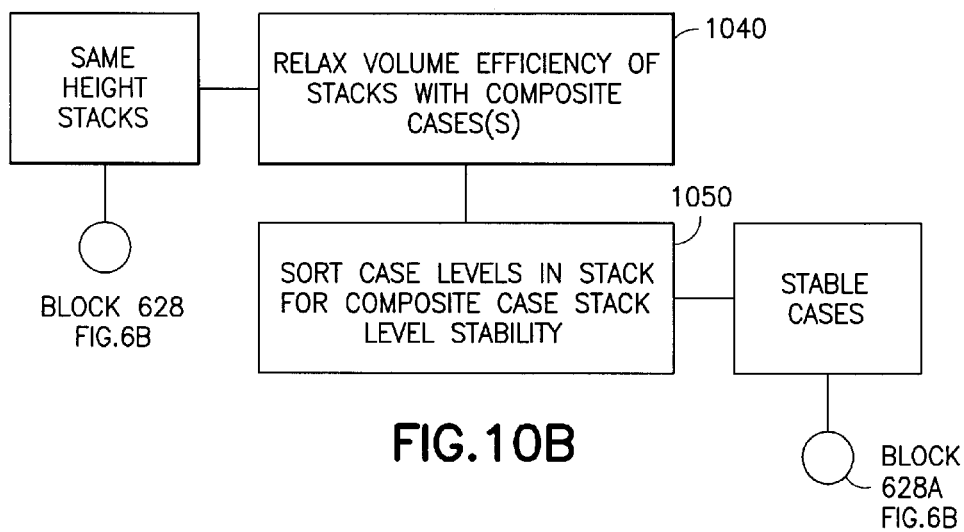
Figure 10C:
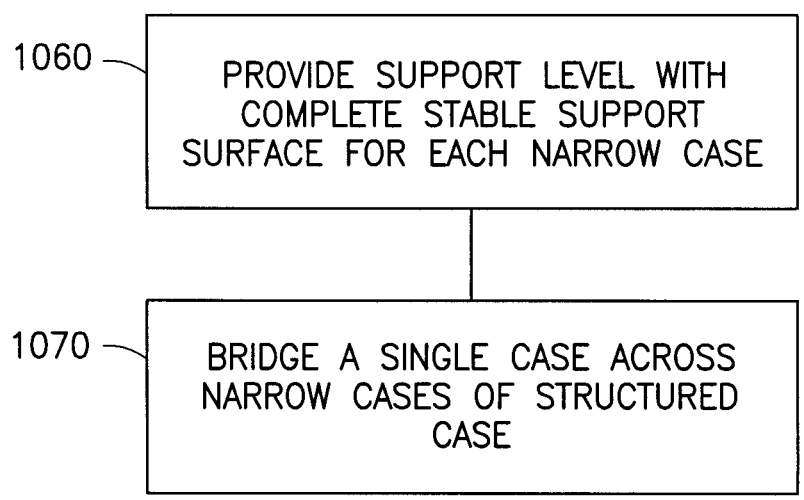

The different virtual structured cases for such height subset may subsequently be treated in a similar manner to stable cases in stack generation as per block 612 in FIG. 6A and block 62B in FIG. 6B. For example, non-intersecting stacks of different heights may generate combining virtual structured cases and stable cases. An iterative process may be used during stack generation with each of the different virtual structured cases (for each case height subset) to identify best fit structured cases and stable stacks. Referring also to FIG. 10B, graphically illustrating other process features, stack efficiency of stacks with virtual structured cases, or in other words narrow cases, may be relaxed (e.g. stack efficiency<90%) compared to stack formed without narrow cases, block 1040. The different virtual structured cases (corresponding to different number of narrow cases) for a given case height may be reviewed within a corresponding stack for best fit or stack efficiency as well as stability such as for example according to the stability rules graphically illustrated in FIG. 10C and programmed in the pallet load generator. For example the virtual structured case (of one, two, three, . . . narrow cases) may be selected that provides the highest stack efficiency and satisfies the stability rules in FIG. 10C. By way of example the supporting level in the stack provides complete stable support surface for each narrow case forming the virtual structured case, block 1060. Further, the immediate overlaying level to be seated in contact with the structured case has a single case that bridges across the narrow cases of the virtual structured case. The virtual structured case that satisfies the stability rules and provides highest efficiency is selected, and remaining narrow cases are returned for further processing as per blocks 1010, 1020 of FIG. 10A. As may be realized, the programming may sort the case levels in the stack to effect best structured case stability and thus best stack stability, block 1050, FIG. 10B. Upon selection of the structured case and stable stacks, the mixed case layer(s) L121-L124 (see also FIG. 12) and the top layers L125, L12T of the pallet load are generated and built substantially as described previously. As may be realized, the arrangement of features in the processes illustrated in the Figs. does not imply performance in a particular order, and the order in which the process features are performed may vary as desired.

In accordance with one aspect of the disclosed embodiment, a material handling system for handling and placing packages onto pallets, the system includes a storage array with storage space for holding packages therein;

an automated package transport system communicably connected to the storage array for storing packages in and retrieving packages from the storage spaces of the storage array;

an automated palletizer for placing packages onto a pallet to form a pallet load, the palletizer is communicably connected to the transport system which provides individual packages from the storage array to the palletizer for forming the pallet load; and a controller operably connected to the palletizer and programmed with a pallet load generator configured so that the pallet load formed by the palletizer has more than one layer of stacked packages, wherein at least one layer of which includes packages of different heights, the at least one layer having a substantially flat upper surface between a top surface of the pallet load and a base surface upon which the at least one layer is seated, and comprises more than one stacks extending from the base surface to the upper surface substantially independent of each other, at least one of the stacks being formed of packages having different heights.

In accordance with an aspect of the exemplary embodiment, more that one of the stacks is formed of packages having different heights.

In accordance with an aspect of the exemplary embodiment, the upper surface defines a seating surface for another layer of stacked packages.

In accordance with an aspect of the exemplary embodiment, at least one stack of the other layer bridges across different stacks of the at least one layer.

In accordance with an aspect of the exemplary embodiment, the other layer forms another substantially flat upper surface between the top surface of the pallet load and the base surface.

In accordance with an aspect of the exemplary embodiment the pallet load generator has predetermined rules for arranging the different height packages in the more than one stacks.

In accordance with an aspect of the exemplary embodiment, an automated palletizer is provided. The palletizer comprises an automated package pick device capable of moving packages from a package deposit section to a pallet to form a pallet load from packages.

A controller is operably connected to the automated pick device. The controller has a pallet load generator configured to determine a pallet load structure of mixed packages. The pallet load generator determines the load structure from mixed package layers overlaid over each other. At least one of the mixed package layers being formed of stacks of mixed packages, top and bottom surfaces of the stacks corresponding to the at least one mixed package layer respectively forming top and bottom surfaces of the at least one layer that are substantially flat. The controller generates commands for the pick to build the pallet load from the load structure determined by the pallet load generator.

In accordance with an aspect of the exemplary embodiment, the tacks corresponding to the at least one mixed package layer are freestanding substantially independent of each other.

In accordance with an aspect of the exemplary embodiment, adjacent layers interlock the stacks corresponding to the at least one mixed package layer.

In accordance with an aspect of the exemplary embodiment, the mixed package layers, formed by stacks of substantially equal heights, the stacks being formed of packages of different heights and being freestanding substantially independent of each other as well as layers formed by packages of the same height, can be permuted on top of one another in a common pallet, or exchanged between different pallets of a common store order.

In accordance with an aspect of the exemplary embodiment, the mixed package layers, each of which is formed by stacks of substantially equal heights, the stacks being formed of packages of different heights, and being freestanding substantially independent of each other, and wherein the mixed package layers as well as layers formed by packages of the same height, can be permuted on top of one another in a common pallet, or exchanged between different pallets of a common store order.

In accordance with one aspect of the disclosed embodiment, an automated palletizer including an automated package pick device capable of moving packages from a package deposit section to a pallet to form a pallet load from packages;

a controller that is operably connected to the automated pick device, the controller having a pallet load generator configured to determine a pallet load structure of mixed packages;

the pallet load generator being programmed so that it determines the load structure from mixed package layers overlaid over each other, at least one of the mixed package layers being formed of stacks of mixed packages, top and bottom surfaces of the stacks corresponding to the at least one mixed package layer respectively forming top and bottom surfaces of the at least one mixed package layer that are substantially flat, wherein the top flat surface is a substantially uniform level seating surface for another of the overlaid layers, the seating surface extending over more than one of the stacks of mixed packages of the at least one mixed package layer; wherein at least one of the more than one stacks of mixed packages has a composite package formed of more than one of the mixed packages arrayed alongside each other in a package array at a common stack level; and wherein the controller generates commands for the pick device to build the pallet load from the load structure determined by the pallet load generator.

In accordance with an aspect of the exemplary embodiment, the stacks corresponding to the at least one mixed package layer are freestanding substantially independent of each other.

In accordance with an aspect of the exemplary embodiment, adjacent layers interlock the stacks corresponding to the at least one mixed package layer.

In accordance with an aspect of the exemplary embodiment, each of the mixed package layers is formed by stacks of substantially equal heights, the stacks being formed of packages of different heights, and being freestanding substantially independent of each other, and wherein the mixed package layers as well as layers formed by packages of the same height can be permuted on top of one another in a common pallet, or exchanged between different pallets of a common store order.

In accordance with an aspect of the exemplary embodiment, the mixed packages include an unstable package disposed in the package array forming the composite package.

In accordance with one aspect of the disclosed embodiment, an automated palletizer including an automated package pick device capable of moving packages from a package deposit section to a pallet to form a pallet load from packages; a controller that is operably connected to the automated pick device, the controller having a pallet load generator configured to determine a pallet load structure of mixed packages; the pallet load generator being programmed so that it determines the load structure from mixed package layers overlaid over each other at least one of the mixed package layers being formed of stacks of mixed packages including unstable packages, top and bottom surfaces of the stacks corresponding to the at least one mixed package layer respectively forming top and bottom surfaces of the at least one mixed package layer that are substantially flat; wherein the controller generates commands for the pick device to build the pallet load from the load structure determined by the pallet load generator.

In accordance with an aspect of the exemplary embodiment, the stacks corresponding to the at least one mixed package layer are freestanding substantially independent of each other and include the unstable packages.

In accordance with an aspect of the exemplary embodiment, each stack corresponding to the at least one mixed package layer is stable independently, and at least one stack of which includes the unstable packages.

In accordance with one aspect of the disclosed embodiment, a method for building a pallet load of mixed packages, the method including forming mixed package stacks from the mixed packages arranging the mixed package stacks into at least one mixed package layer; and overlaying another layer of packages over the at least one mixed package layer; the top and bottom surfaces of at least one of the mixed package stacks respectively defining top and bottom surfaces of the at least one mixed package layer each of which is substantially flat, the top surface of the at least one mixed package layer being uniformly level and extending over more than one of the mixed package stacks forming the at least one mixed package layer.

In accordance with an aspect of the exemplary embodiment, the mixed package stacks forming the at least one mixed package layer are non-intersecting stacks, and wherein arranging the mixed package stacks comprises standing each of the mixed package stacks substantially independently of each other.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An automated palletizer comprising:
an automated package pick device capable of moving packages from a package deposit section to a pallet to form a pallet load from packages;
a controller that is operably connected to the automated pick device, the controller having a pallet load generator configured to determine a pallet load structure of mixed packages;
the pallet load generator being programmed so that it determines the load structure from seamless mixed package layers overlaid over each other, at least one of the seamless mixed package layers being formed of stacks of mixed packages, at least one of the stacks is formed of mixed packages stacked in a common column within the at least one of the stacks, top and bottom surfaces of the stacks corresponding to the at least one mixed package layer respectively forming top and bottom surfaces of the at least one seamless mixed package layer that are substantially flat; wherein
the controller generates commands for the pick device to build the pallet load from the load structure determined by the pallet load generator, and the stacks corresponding to the at least one seamless mixed package layer are freestanding in the common column substantially independent of each other, wherein the stacked mixed packages forming the at least one of the stacks effect independently the substantially independent freestanding of the at least one of the stacks.

2. The automated palletizer as in claim 1, wherein adjacent layers interlock the stacks corresponding to the at least one seamless mixed package layer.

3. The automated palletizer as in claim 1, wherein the seamless mixed package layers, each of which is formed by stacks of substantially equal heights, the stacks being formed of packages of different heights, and being freestanding substantially independent of each other, and wherein the seamless mixed package layers as well as layers formed by packages of the same height, can be permuted on top of one another in a common pallet, or exchanged between different pallets of a common store order.

4. An automated palletizer comprising:
an automated package pick device capable of moving packages from a package deposit section to a pallet to form a pallet load from packages;
a controller that is operably connected to the automated pick device, the controller having a pallet load generator configured to determine a pallet load structure of mixed packages;
the pallet load generator being programmed so that it determines the load structure from seamless mixed package layers overlaid over each other, at least one of the seamless mixed package layers being formed of stacks of mixed packages including unstable packages, at least one of the stacks is formed of mixed packages stacked in a common column within the at least one of the stacks, top and bottom surfaces of the stacks corresponding to the at least one seamless mixed package layer respectively forming top and bottom surfaces of the at least one seamless mixed package layer that are substantially flat; wherein
the controller generates commands for the pick device to build the pallet load from the load structure determined by the pallet load generator, and the stacks corresponding to the at least one seamless mixed package layer are freestanding in the common column substantially independent of each other wherein the stacked mixed packages forming the at least one of the stacks effect independently the substantially independent freestanding of the at least one of the stacks.

5. The automated palletizer as in claim 4, wherein the stacks corresponding to the at least one seamless mixed package layer include the unstable packages.

6. The automated palletizer as in claim 4, wherein each stack corresponding to the at least one seamless mixed package layer is stable independently, and at least one stack of which includes the unstable packages.

7. A method for building a pallet load of mixed packages, the method comprising:
forming mixed package stacks from the mixed packages, at least one of the mixed package stacks is formed of mixed packages within the at least one of the mixed package stacks;
arranging the mixed package stacks into at least one seamless mixed package layer and the stacks corresponding to the at least one seamless mixed package layer are freestanding in a common column substantially independent of each other, wherein the stacked mixed packages forming the at least one of the stacks effect independently a substantially independent freestanding of the at least one of the mixed package stacks; and
overlaying another layer of packages over the at least one seamless mixed package layer;
the top and bottom surfaces of at least one of the mixed package stacks respectively defining top and bottom surfaces of the at least one seamless mixed package layer each of which is substantially flat, the top surface of the at least one mixed package layer being uniformly level and extending over more than one of the mixed package stacks forming the at least one seamless mixed package layer.

8. The method of claim 7, wherein the mixed package stacks forming the at least one seamless mixed package layer are non-intersecting stacks, and wherein arranging the mixed package stacks comprises standing each of the mixed package stacks substantially independently of each other.

9. The method of claim 7, wherein each of the at least one seamless mixed package layer is stronger than the layer of packages overlaid above it.

10. The method of claim 7, wherein each of the at least one seamless mixed package layer is heavier than the layer of packages overlaid above it.

11. The method of claim 7, further comprising arranging the mixed package stacks of the at least one seamless mixed package layer to correspond to a pallet length and width.

12. The method of claim 7, wherein the topmost layer of the at least one seamless mixed package layer has a substantially non-flat top surface.

13. A pallet load comprising:
more than one stack of stacked packages on a pallet base;
wherein, each of the more than one stack are positioned between an upper surface of the pallet load and a base surface upon which each of the more than one stack is seated, each of the more than one stack extends from the base surface to the upper surface in a common column substantially independent of each other, and stable, between the base surface and the upper surface, at least one of the independent stacks being formed of packages of different heights, wherein the stacked packages forming the at least one of the independent stacks effect independently a substantially independent freestanding in the common column of the at least one of the independent stacks.

14. The pallet load of claim 13, wherein at least one of the independent stacks has a different height relative to another stack.

15. The pallet load of claim 13, wherein each of the more than one stack has at least one stable package seated at the base surface.

16. The pallet load of claim 13, wherein a stable interface exists between stacked packages within each of the more than one stack.

17. An automated palletizer comprising:
an automated package pick device capable of moving packages from a package deposit section to a pallet to form a pallet load from packages;
a controller operably connected to the automated palletizer and programmed with a pallet load generator configured so that the pallet load formed by the automated palletizer has more than one stack of stacked packages;
wherein the pallet load generator is programmed to generate a load structure by determining each of the more than one stack of stacked packages, each of the more than one stack are positioned between an upper surface of the pallet load and a base surface upon which each of the more than one stack is seated, each of the more than one stack extends from the base surface to the upper surface in a common column substantially independent of each other, and stable, between the base surface and the upper surface, at least one of the independent stacks being formed of packages of different heights wherein the stacked packages forming the at least one of the independent stacks effect independently a substantially independent freestanding in the common column of the at least one of the independent stacks; and
wherein, the controller generates commands for the automated package pick device to build the pallet load from the load structure determined by the pallet load generator.

18. The automated palletizer of claim 17, wherein at least one of the independent stacks has a different height relative to another stack.

19. The automated palletizer of claim 17, wherein each of the more than one stack has at least one stable package seated at the base surface.

20. The automated palletizer of claim 17, wherein a stable interface exists between stacked packages within each of the more than one stack.

21. The automated palletizer of claim 17, wherein the pallet load generator has predetermined rules for arranging the different height packages within at least one of the independent stacks.

22. An automated palletizer comprising:
an automated package pick device capable of moving packages from a package deposit section to a pallet to form a pallet load from packages;
a controller that is operably connected to the automated pick device, the controller having a pallet load generator configured to determine a pallet load structure of mixed packages;
the pallet load generator being programmed so that it determines the load structure from seamless mixed package layers overlaid over each other, at least one of the seamless mixed package layers being formed of stacks of mixed packages, at least one of the stacks is formed of mixed packages stacked in a common column within the at least one of the stacks and the at least one of the stacks includes at least one of the mixed packages within the at least one of the stacks having a different length or width from another stacked package within the at least one of the stacks, top and bottom surfaces of the stacks corresponding to the at least one seamless mixed package layer respectively forming top and bottom surfaces of the at least one seamless mixed package layer that are substantially flat; wherein
the controller generates commands for the pick device to build the pallet load from the load structure determined by the pallet load generator, and the stacks corresponding to the at least one seamless mixed package layer are freestanding in the common column substantially independent of each other, wherein the stacked mixed packages forming the at least one of the stacks effect independently the substantially independent freestanding of the at least one of the stacks.

23. An automated palletizer comprising:
an automated package pick device capable of moving packages from a package deposit section to a pallet to form a pallet load from packages;
a controller operably connected to the automated palletizer and programmed with a pallet load generator configured so that the pallet load formed by the automated palletizer has more than one stack of stacked packages;
wherein the pallet load generator is programmed to generate a load structure by determining each of the more than one stack of stacked packages, each of the more than one stack are positioned between an upper surface of the pallet load and a base surface upon which each of the more than one stack is seated, each of the more than one stack extends from the base surface to the upper surface in a common column substantially independent of each other, and stable, between the base surface and the upper surface, at least one of the independent stacks being formed of packages of different heights wherein the stacked packages forming the at least one of the independent stacks effect independently a substantially independent freestanding in the common column of the at least one of the independent stacks and the at least one of the independent stacks includes at least one of the stacked packages within the at least one of the independent stacks having a different length or width from another stacked package within the at least one of the stacks; and wherein, the controller generates commands for the automated package pick device to build the pallet load from the load structure determined by the pallet load generator.

* * * * *